United States Patent
Hwang et al.

(10) Patent No.: US 9,851,895 B2
(45) Date of Patent: Dec. 26, 2017

(54) TERMINAL AND METHOD OF SHARING A HANDWRITING THEREIN

(71) Applicant: LG ELECTRONICS INC., Seoul (KR)

(72) Inventors: Keumsung Hwang, Seoul (KR); Miyoung Kim, Seoul (KR); Guwan Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 13/931,264

(22) Filed: Jun. 28, 2013

(65) Prior Publication Data

US 2014/0028613 A1     Jan. 30, 2014

(30) Foreign Application Priority Data

Jul. 26, 2012 (KR) .......................... 10-2012-0081799

(51) Int. Cl.
    *G06F 3/0488*     (2013.01)
    *G06F 3/14*     (2006.01)

(52) U.S. Cl.
    CPC ........ *G06F 3/04883* (2013.01); *G06F 3/1454* (2013.01); *G09G 2356/00* (2013.01); *G09G 2370/16* (2013.01)

(58) Field of Classification Search
    CPC .. G06F 3/04883; G06F 3/0488; G06F 17/241; G06F 17/242
    USPC ............................. 345/2.3, 173; 715/863, 230
    See application file for complete search history.

(56) References Cited

U.S. PATENT DOCUMENTS

| | | | | |
|---|---|---|---|---|
| 2003/0217336 | A1* | 11/2003 | Gounares | G06F 3/0481 715/268 |
| 2008/0114844 | A1* | 5/2008 | Sanchez et al. | 709/206 |
| 2009/0312065 | A1* | 12/2009 | Wang | G06F 17/242 455/566 |
| 2009/0327856 | A1* | 12/2009 | Mouilleseaux | G06F 17/30781 715/230 |
| 2011/0070878 | A1* | 3/2011 | Kim | H04L 12/40013 455/420 |
| 2011/0134030 | A1* | 6/2011 | Cho | G06F 3/03547 345/157 |
| 2011/0216236 | A1* | 9/2011 | Kasahara | H04N 5/2256 348/370 |
| 2011/0283334 | A1 | 11/2011 | Choi et al. | |

(Continued)

FOREIGN PATENT DOCUMENTS

| | | |
|---|---|---|
| CN | 102244676 A | 11/2011 |
| CN | 102486716 A | 6/2012 |

OTHER PUBLICATIONS

European Search Report dated Nov. 8, 2013 for corresponding Application No. 13175171.1.

*Primary Examiner* — Ibrahim Khan
(74) *Attorney, Agent, or Firm* — KED & Associates, LLP

(57) ABSTRACT

A terminal and handwriting sharing method thereof are disclosed, by which a handwriting input is shared between the terminal and an external terminal. The present invention includes a touchscreen configured to display a trace of a user touch input, a wireless communication unit configured to configure a wireless network with an external terminal, and a controller, if a touch input is applied via the touchscreen, controlling a trace of the touch input to be displayed on at least one of the touchscreen and the external terminal.

13 Claims, 26 Drawing Sheets

(56) References Cited

U.S. PATENT DOCUMENTS

2012/0139951 A1* 6/2012 Hwang ............... G06F 3/04883
345/665
2013/0229333 A1* 9/2013 Schwartz et al. ............. 345/156
2014/0019882 A1* 1/2014 Chew et al. .................. 715/753

* cited by examiner (a)

FIG. 4B
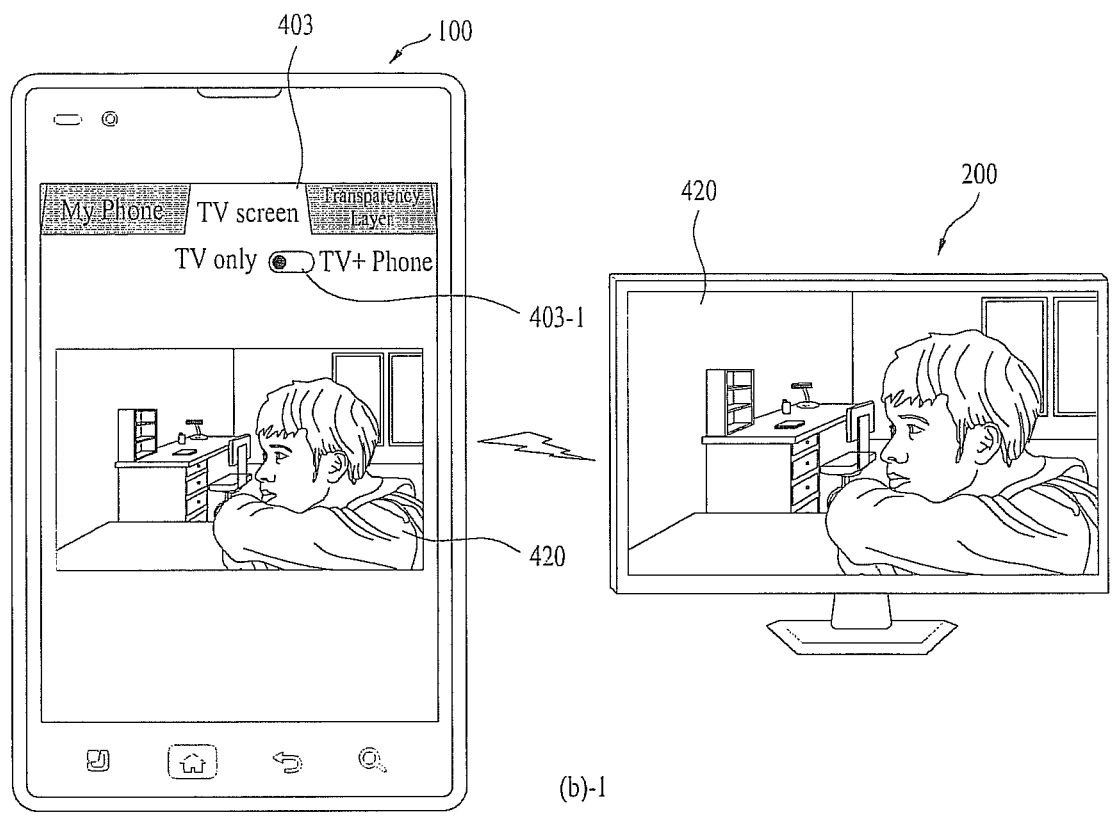
(b)-1
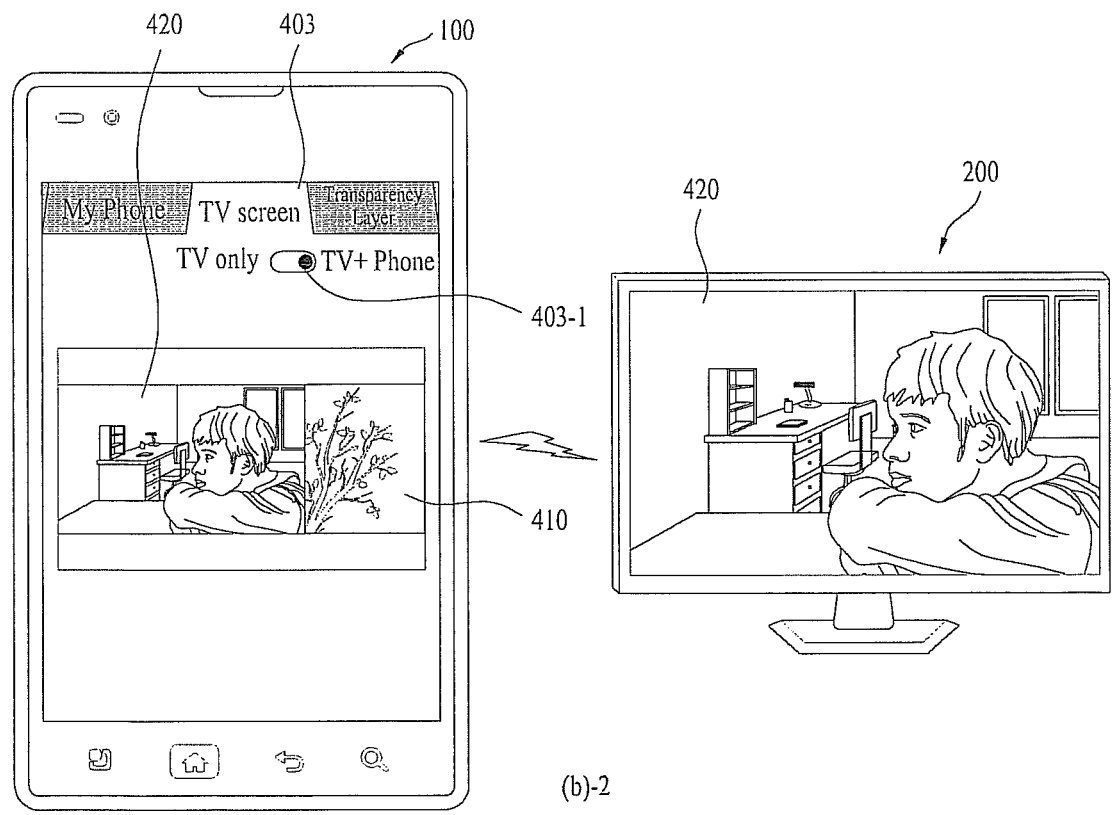
(b)-2

(c)

FIG. 5A
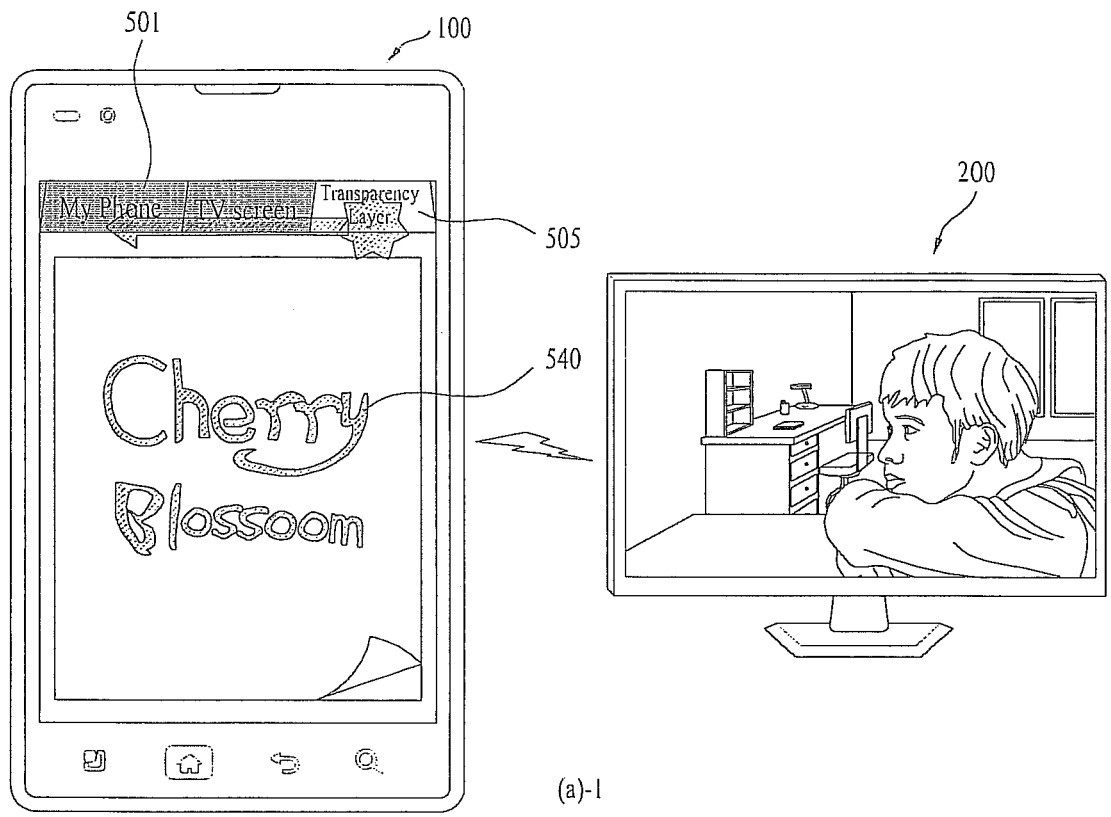
(a)-1
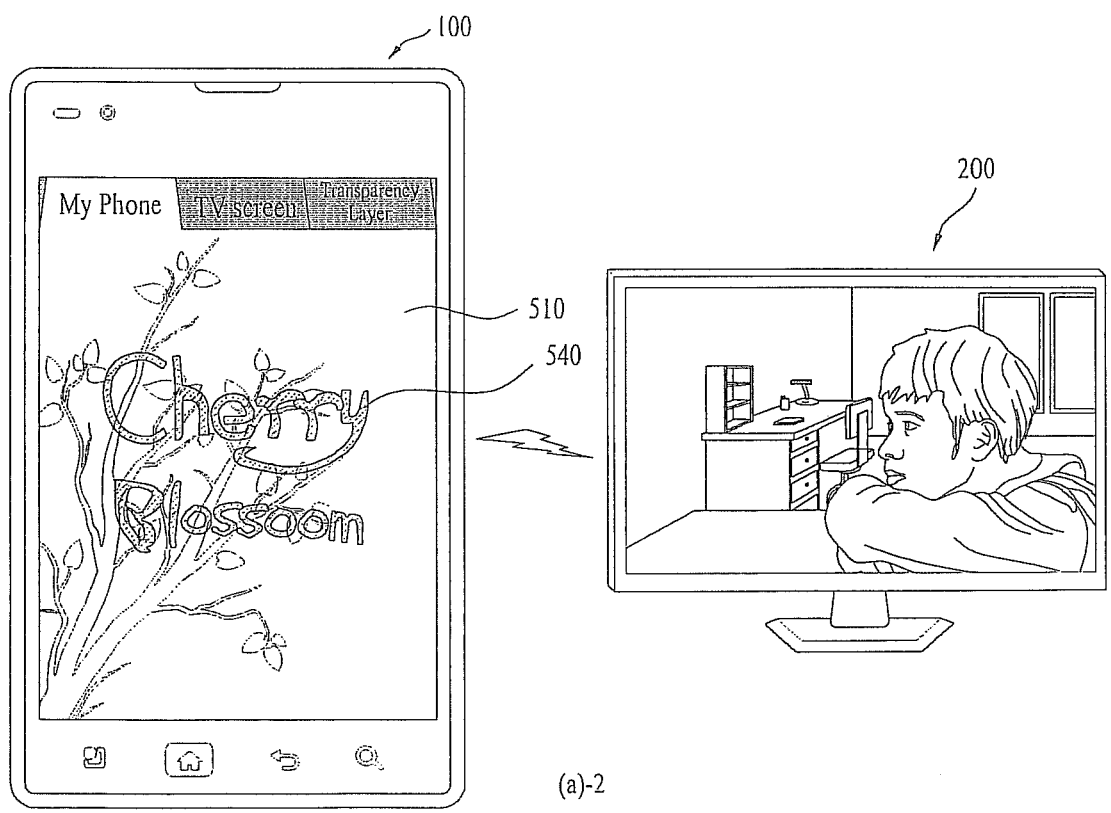
(a)-2

(b)

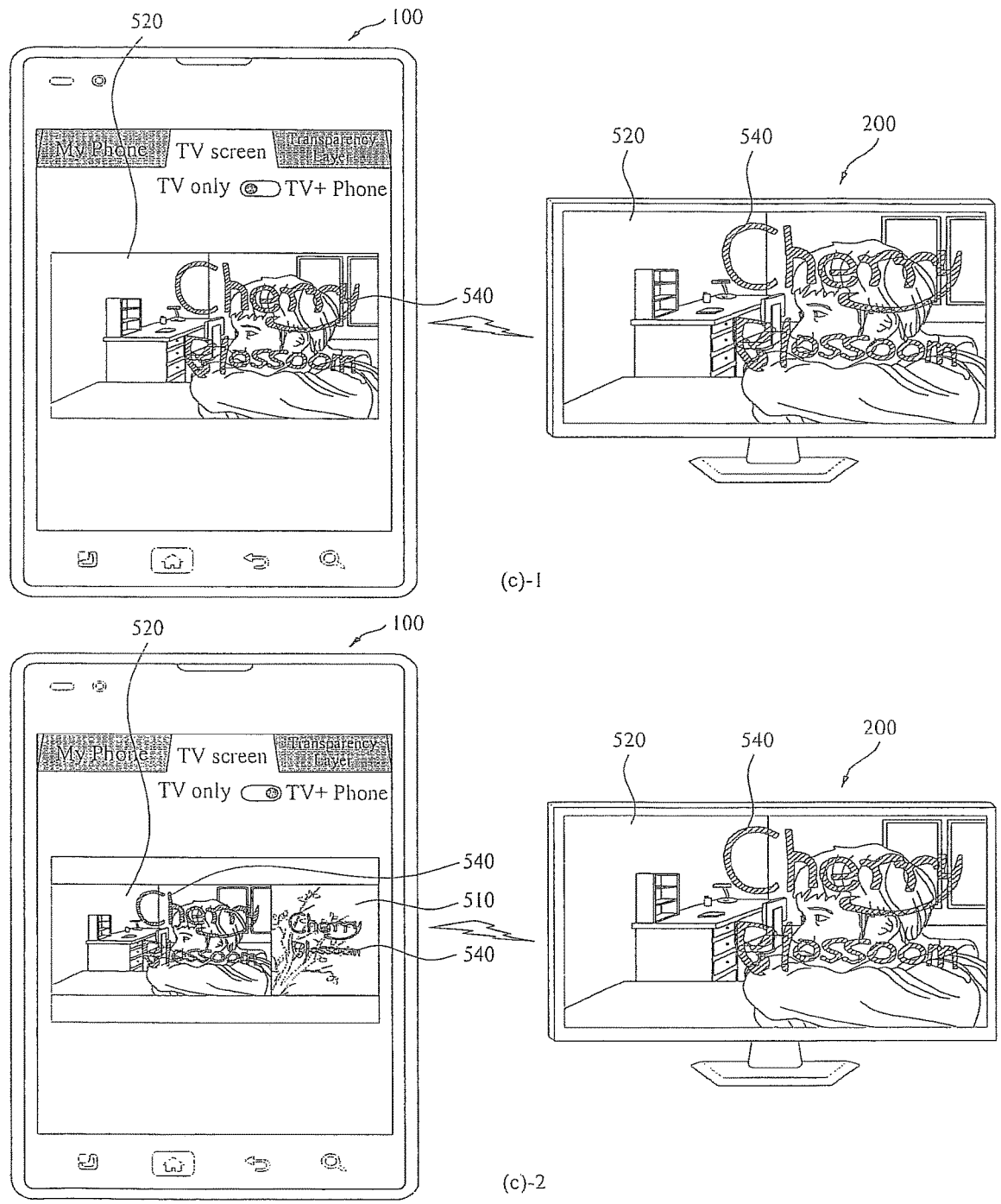

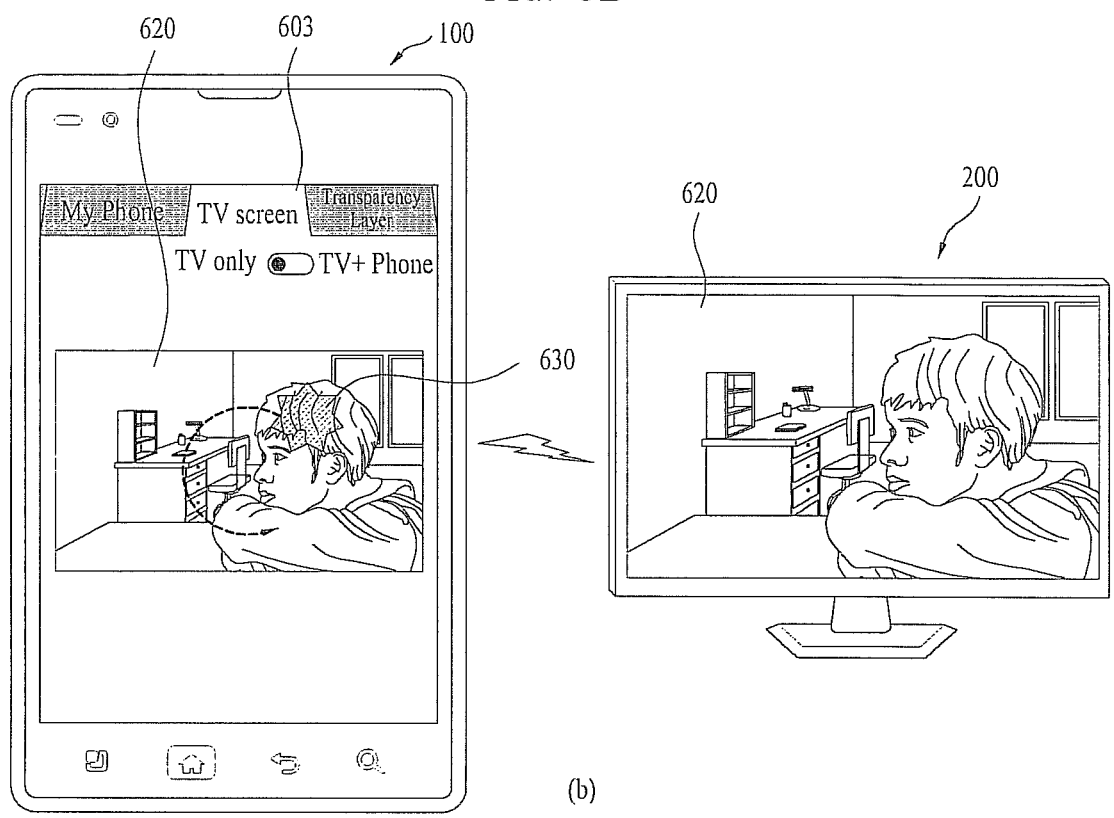

FIG. 6C
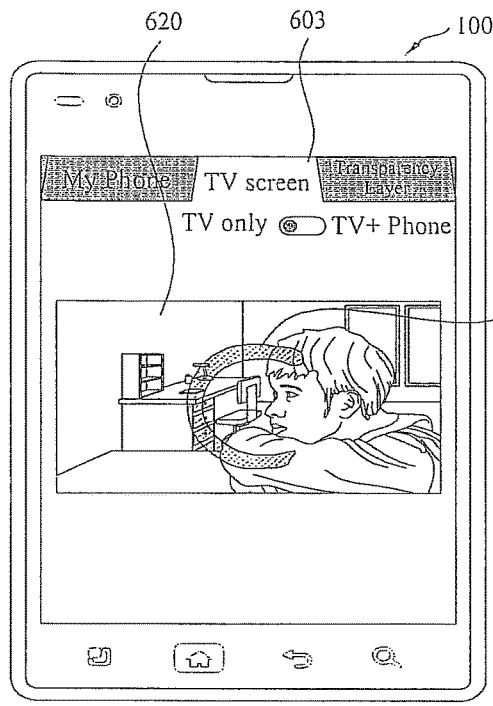
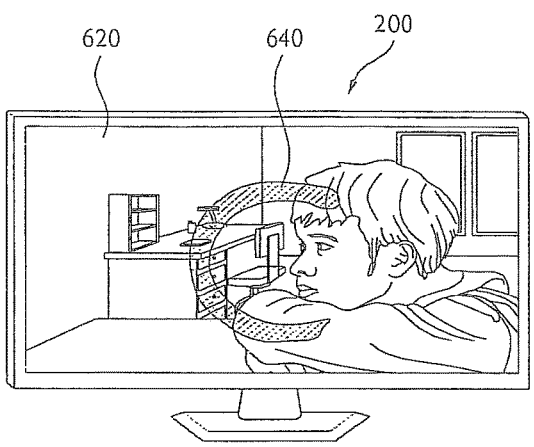
(c)-1
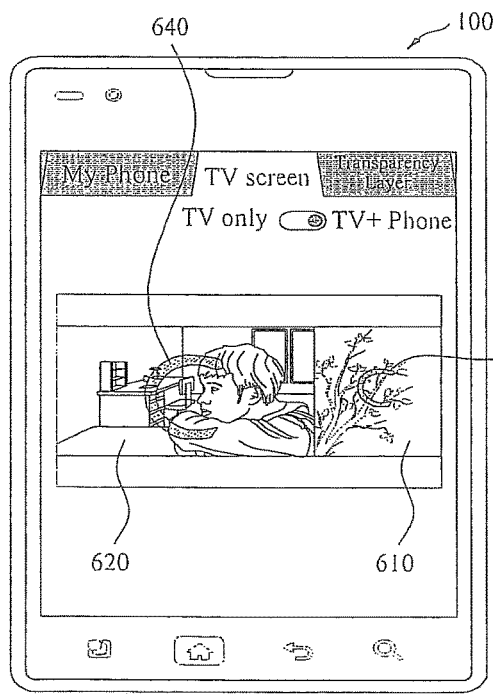
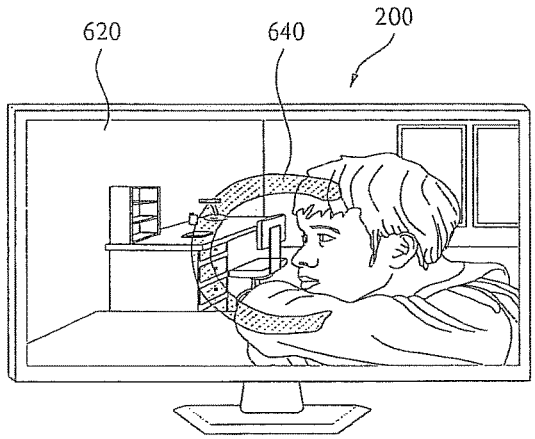
(c)-2

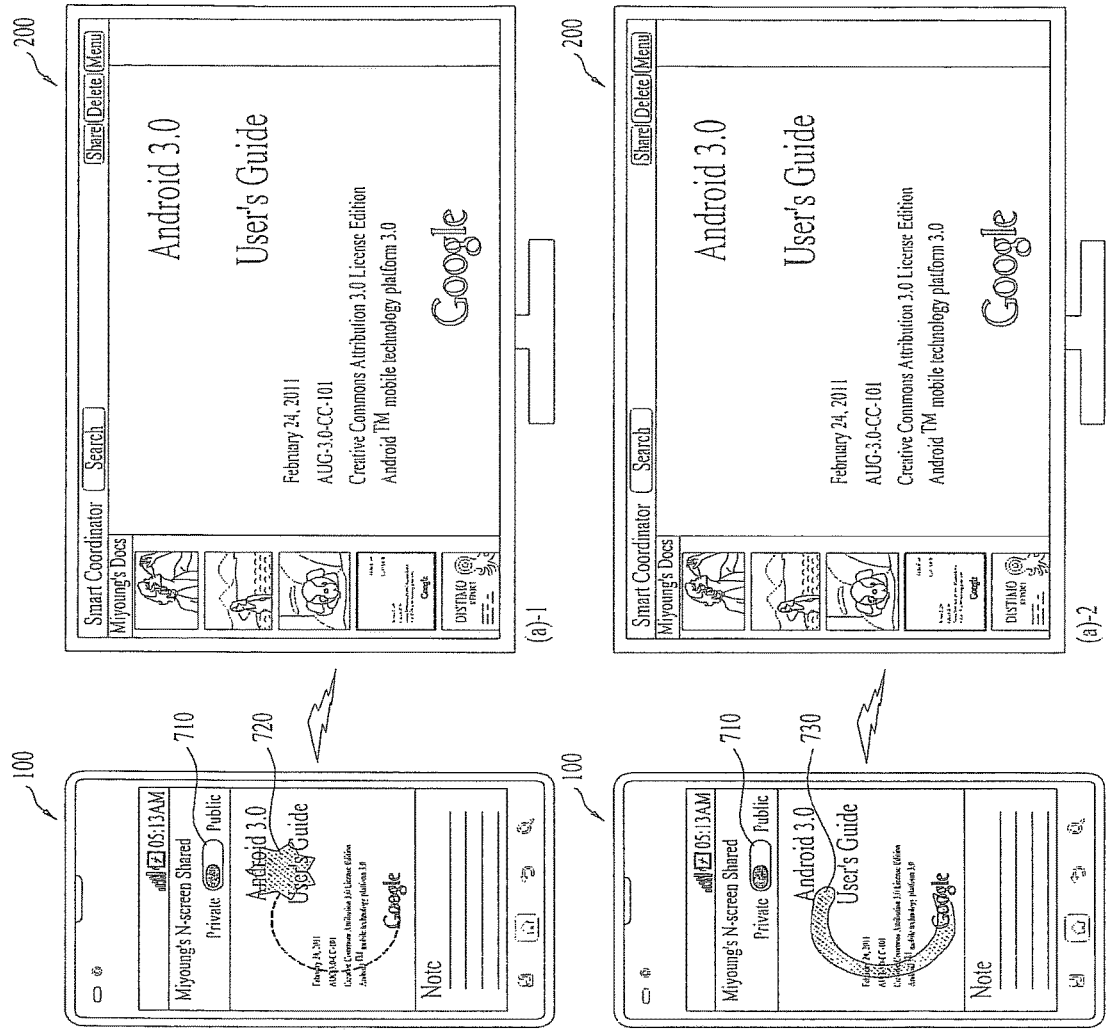

(a)

TERMINAL AND METHOD OF SHARING A HANDWRITING THEREIN

CROSS-REFERENCE TO RELATED APPLICATION(S)

This application claims priority under 35 U.S.C. §119 to Korean Application No. 10-2012-0081799, filed on Jul. 26, 2012, whose entire disclosure(s) is/are hereby incorporated by reference.

BACKGROUND

1. Field

The present invention relates to a terminal, and more particularly, to a terminal and method of sharing a handwriting therein. Although the present invention is suitable for a wide scope of applications, it is particularly suitable for sharing a handwriting input applied to the terminal with an external terminal.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

Moreover, the terminal expands its roles into a scheduler function for simple memo input and storage, schedule management and the like. Recently, in order to reinforce the scheduler function, a terminal tends to be designed for enabling a user to input a handwriting without activating an application separately.

However, a method of sharing a handwriting input applied to a terminal with an external device has not been developed yet. For instance, while a presentation is made in a seminar or the like, only a person, who is manipulating a computer provided to make the presentation, is able to apply a handwriting input to a presentation material. And, there is no way for other persons to apply a handwriting input to the presentation material. In case that a presentation listening person has an instant idea in the course of the presentation, it may cause a problem of an absence of a means or method for recording the instant idea.

Thus, the demand for effectively performing a handwriting input on an external terminal via a terminal is rising.

SUMMARY OF THE INVENTION

Accordingly, embodiments of the present invention are directed to a terminal and method of sharing a handwriting therein that substantially obviate one or more problems due to limitations and disadvantages of the related art.

An object of the present invention is to provide a terminal and method of sharing a handwriting therein, by which convenience of user's manipulation is enhanced.

In particular, one object of the present invention is to provide a terminal and method of sharing a handwriting therein, by which a handwriting input can be performed on an external terminal using a terminal.

Another object of the present invention is to provide a terminal and method of sharing a handwriting therein, by which a handwriting input applied to an external terminal can be displayed.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal according to the present invention may include a touchscreen configured to display a trace of a user touch input, a wireless communication unit configured to configure a wireless network with an external terminal, and a controller, if a touch input is applied via the touchscreen, controlling a trace of the touch input to be displayed on at least one of the touchscreen and the external terminal.

In another aspect of the present invention, a terminal according to the present invention may include a display unit configured to display a trace of a user touch input applied to an external terminal, a wireless communication unit configured to configure a wireless network with the external terminal, and a controller, if the touch input is applied via the external terminal, determining whether to display a trace of the touch input via the display unit In another aspect of the present invention, a method of sharing a handwriting in a terminal according to the present invention may include the steps of configuring a wireless network with an external terminal, detecting a touch input via a display unit, determining a displayed position of a trace of the touch input, and displaying the trace of the touch input on at least one of the external terminal and the display unit depending on a result of the determining step.

In a further aspect of the present invention, a method of sharing a handwriting in a terminal according to the present invention may include the steps of configuring a wireless network with an external terminal, detecting a touch input applied to the external terminal, determining whether to display a trace of the touch input on a display unit, and displaying the trace of the touch input depending on a result of the determining step.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIGS. 4A to 4C are diagrams of display screen configurations for one example of displaying a content of an external terminal on a touchscreen;

FIGS. 5A to 5C are diagrams of display screen configurations for one example to describe a process for displaying a handwriting input on at least one of a touchscreen and an external terminal using an activation tab shown in FIG. 4;

FIGS. 6A to 6C are diagrams of display screen configurations for another example to describe a process for displaying a handwriting input result on at least one of a touchscreen and an external terminal using an activation tab shown in FIG. 4;

FIGS. 7A to 7C are diagrams of display screen configurations for another example to describe a process for displaying a handwriting input result on at least one of a touchscreen and an external terminal using an activation tab shown in FIG. 4;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, terminals described in this disclosure can include a mobile terminal as mobile phone, a smart phone, a laptop computer, a digital broadcast terminal, a PDA (personal digital assistants), a PMP (portable multimedia player), a navigation system and the like, and a stationary terminal as a digital TV, a desktop computer and the like.

Figure 1:
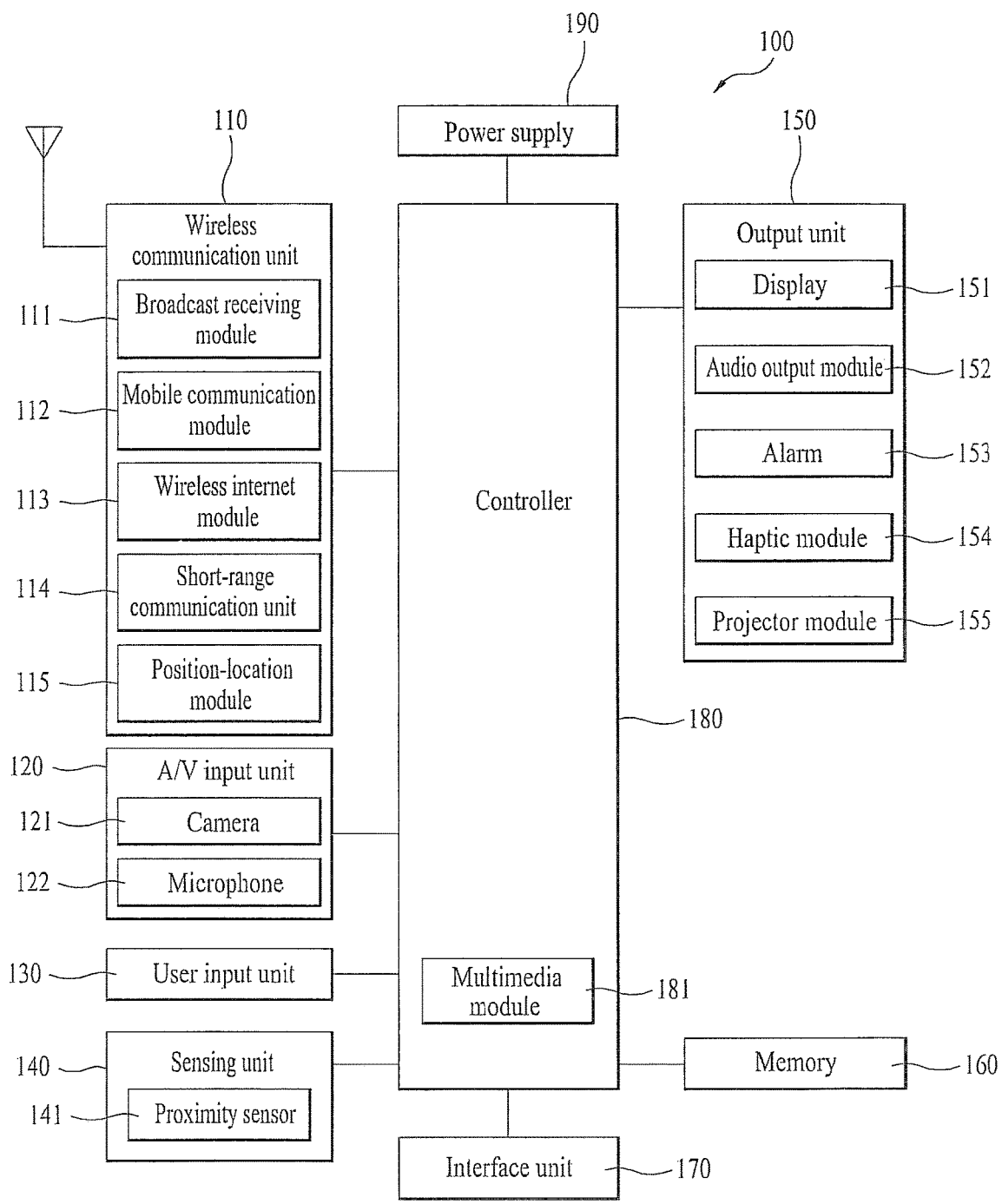
FIG. 1 is a block diagram of a terminal according to one embodiment of the present invention.

FIG. 1 is a block diagram of a terminal according to one embodiment of the present invention.

Referring to FIG. 1, a terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the terminal 100 having various components, but it is understood that implementing all of the illustrated components is not a requirement. Greater or fewer components may alternatively be implemented.

In the following description, the above elements of the terminal 100 are explained in sequence.

First of all, the wireless communication unit 110 typically includes one or more components which permits wireless communication between the terminal 100 and a wireless communication system or network within which the terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the terminal 100. This module may be internally or externally coupled to the terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the terminal 100. If desired, this module may be implemented with a global positioning system (GPS) module.

Referring to FIG. 1, the audio/video (NV) input unit 120 is configured to provide audio or video signal input to the terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the terminal 100 using status measurements of various aspects of the terminal. For instance, the sensing unit 140 may detect an open/close status of the terminal 100, relative positioning of components (e.g., a display and keypad) of the terminal 100, a change of position of the terminal 100 or a component of the terminal 100, a presence or absence of user contact with the terminal 100, orientation or acceleration/deceleration of the terminal 100. As an example, consider the terminal 100 being configured as a slide-type terminal. In this configuration, the sensing unit 140 may sense whether a sliding portion of the terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the terminal 100. For instance, if the terminal is operating in a phone call mode, the display will generally provide a user interface (UI) or graphical user interface (GUI) which includes information associated with placing, conducting, and terminating a phone call. As another example, if the terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the terminal 100 in accordance with the implemented configuration of the terminal 100. For instance, a plurality of display units can be arranged on a single face of the terminal 100 in a manner of being spaced apart from each other or being built in one body. Alternatively, a plurality of display units can be arranged on different faces of the terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the terminal 100 in accordance with the corresponding configuration type of the terminal 100.

The projector module 155 is the element for performing an image projector function using the terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the terminal 100. And, it is understood that the projector module 155 can be provided to any portion of the terminal 100 according to the necessity thereof.

The memory unit 160 is generally used to store various types of data to support the processing, control, and storage requirements of the terminal 100. Examples of such data include program instructions for applications operating on the terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the terminal 100 is able to operate in association with a web storage for performing a storage function of the memory 160 on Internet.

The interface unit 170 is often implemented to couple the terminal 100 with external devices. The interface unit 170 receives data from the external devices or is supplied with the power and then transfers the data or power to the respective elements of the terminal 100 or enables data within the terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the terminal 100 via the corresponding port.

When the terminal 110 is connected to an external cradle, the interface unit 170 becomes a passage for supplying the terminal 100 with a power from the cradle or a passage for delivering various command signals inputted from the cradle by a user to the terminal 100. Each of the various command signals inputted from the cradle or the power can operate as a signal enabling the terminal 100 to recognize that it is correctly loaded in the cradle.

The controller 180 typically controls the overall operations of the terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
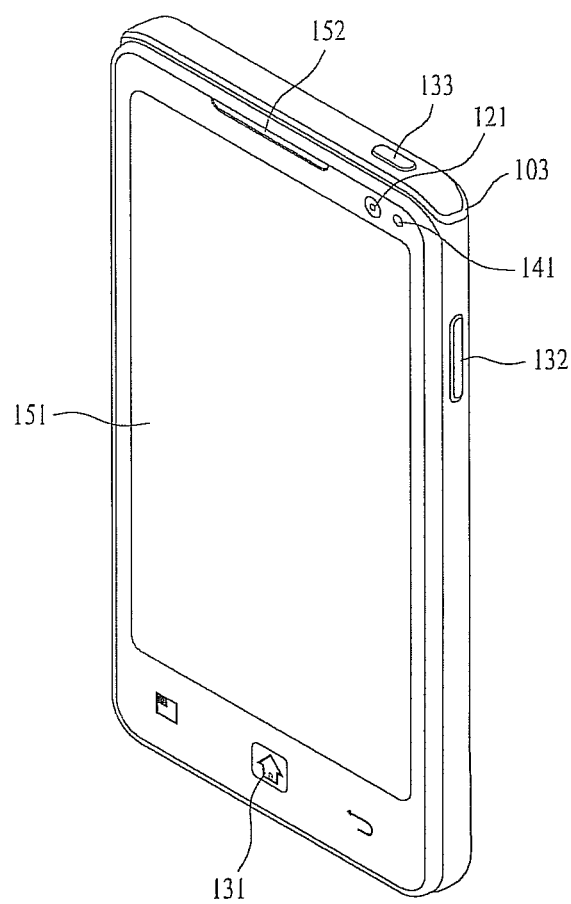
FIG. 2A is a front perspective diagram of a terminal according to one embodiment of the present invention.

FIG. 2A is a front perspective diagram of a terminal according to one embodiment of the present invention.

The terminal 100 shown in the drawing has a bar type terminal body. Yet, the terminal 100 may be implemented in a variety of different configurations. Examples of such configurations include folder-type, slide-type, rotational-type, swing-type and combinations thereof. For clarity, further disclosure will primarily relate to a bar-type terminal 100. However such teachings apply equally to other types of terminals.

Referring to FIG. 2A, the terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
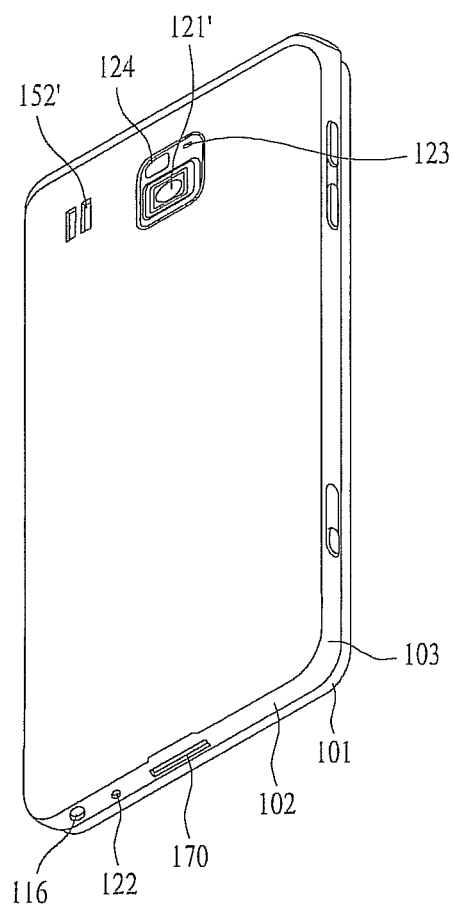
FIG. 2B is a rear perspective diagram of a terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

For clarity and convenience of the following description, assume that the mobile terminal 100 mentioned in the following description includes at least one of the components shown in FIG. 1. In particular, the mobile terminal 100 according to the present invention may be able to further include the wireless communication unit 100, the display unit 151, the memory 160 and the controller 180 among the components shown in FIG. 1. If the display module 151 of the mobile terminal 100 according to the present invention includes a touchscreen 151, implementation of the following embodiments may be further facilitated. Therefore, the following description is made on the assumption that the display module 151 includes the touchscreen 151.

A handwriting input sharing method according to the present invention may be described in a manner of being categorized into a first sharing method in aspect of a touch input providing terminal and a second sharing method in aspect of a touch input receiving terminal. In particular, according to the first sharing method, the touch input providing terminal provides a touch input applied to a touchscreen of its own to an external terminal 200 and then controls a trace of the touch input to be displayed via the external terminal 200. And, according to the second sharing method, the touch input receiving terminal is provided with a touch input applied to the external terminal 200 and then displays a trace of the touch input on a touchscreen of its own.

In more particular, the handwriting input sharing method may be categorized into the first sharing method or the second sharing method depending on whether a touch input is inputted via a touchscreen of a terminal or an external terminal.

For clarity of the following description, with reference to the accompanying drawings, the first sharing method is described in the first and the second sharing method will be then described. For clarity, in the accompanying drawings referred to for the following description of the first sharing method, a terminal 100 and an external terminal 200 may be assumed as a smart phone and a smart TV, respectively. For clarity, in the accompanying drawings referred to for the following description of the second sharing method, a terminal 100 and an external terminal 200 may be assumed as a smart TV and a smart phone, respectively.

Figure 3:
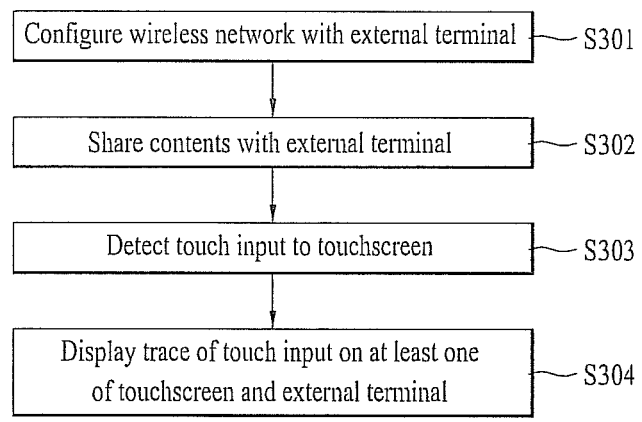
FIG. 3 is a control flowchart of a first sharing method according to the present invention.

FIG. 3 is a control flowchart of a first sharing method according to the present invention.

Referring to FIG. 3, a terminal 100 may be able to establish a wireless network with an external terminal 200 using the wireless communication unit 110 under the control of the controller 180 [S301]. For instance, the wireless network between the wireless communication unit 110 and the external terminal 200 may be established using such a communication technology, which does not use AP (access point), as Wi-Fi Direct, Bluetooth, Ad-hoc and the like. The wireless network between the wireless communication unit 110 and the external terminal 200 may be established using such a communication technology using AP as Wibro, Wi-Fi, Zigbee and the like.

The controller 180 may control the touchscreen 151 to output the same content of the external terminal 200 or may control the touchscreen 151 and the external terminal 200 to output different contents, respectively. In case that the touchscreen 151 and the external terminal 200 are set to output the same content, if a wireless network is established between the wireless communication unit 110 and the external terminal 200, the terminal 100 may be set to share a content saved in the memory 160 with the external terminal 200 or may be set to share a content saved in the external terminal 200 [S302]. On the other hand, if the touchscreen 151 and the external terminal 200 are set to output different contents, respectively, the above-mentioned step S302 may be skipped.

In particular, if a content provided by the terminal 100 is set to be shared with the external terminal 200, the controller 180 may control the content saved in the memory 160 to be provided to the external terminal 200. In doing so, the external terminal 200 displays the content received from the terminal 100 and may be then able to control the same content of the terminal 100 to be outputted.

On the other hand, if the content saved in the external terminal 200 is set to be shared with the terminal 100, the controller 180 may be able to control the wireless communication unit 110 to receive a content file from the external terminal 200. Once the wireless communication unit 110 receives the content from the external terminal 200, the controller 180 outputs the received content to the touchscreen 151, thereby controlling the terminal 100 and the external terminal 200 to output the same content.

Meanwhile, the contents mentioned in the above description may include various kinds of multimedia data used as backgrounds of handwriting inputs as image files, video files, e-book files, document files, broadcast data and the like. A process for the terminal 100 and the external terminal 200 to display the same content is described in detail with reference to FIG. 4 as follows.

Figure 4A:
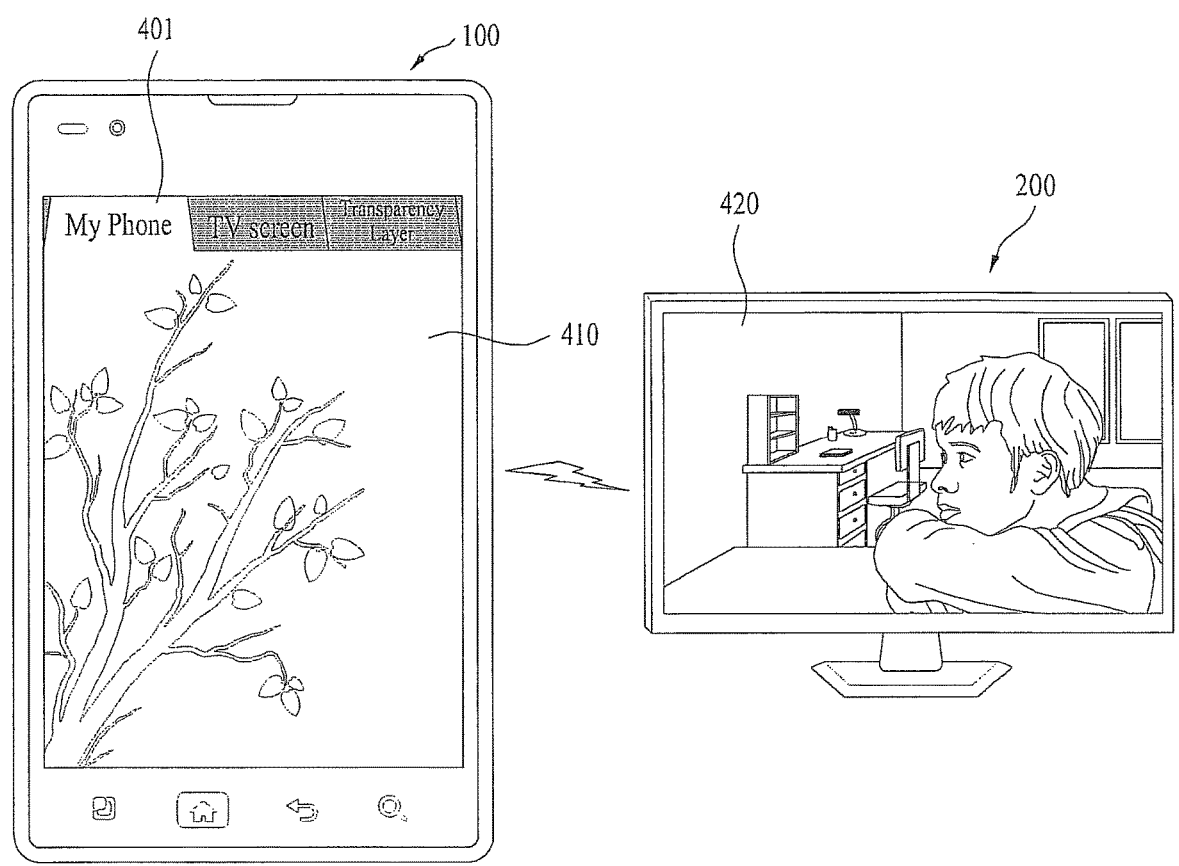
Figure 4C:
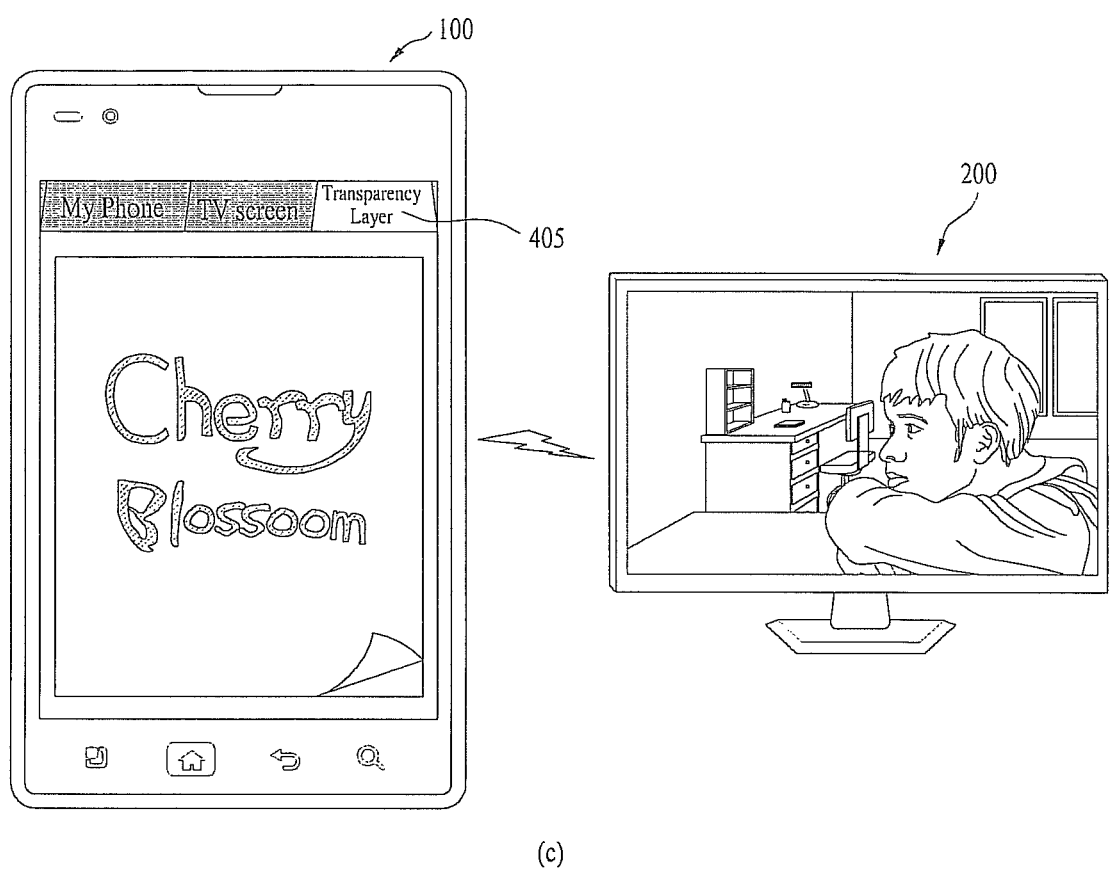

FIGS. 4A to 4C are diagrams of display screen configurations for one example of displaying a content of an external terminal on a touchscreen. For clarity of the following description, assume that data provided by the external terminal 200 includes broadcast data.

Referring to FIG. 4A, the controller 180 controls the touchscreen 151 to display 3 kinds of menu tabs selectable by a user. If a tab 'My Phone' 401 is activated, the controller 180 excludes an output image outputted from the external terminal 200 but controls a content 410 saved in the external terminal 200 to be outputted via the touchscreen 151 only.

In particular, while the tab 'My Phone' 410 is active, the touchscreen 151 and the external terminal 200 may output different images 410 and 420, respectively.

Referring to FIG. 4B, if a tab 'TV screen' is activated, the controller 180 may control the touchscreen 151 to output the content 420 received from the external terminal 200. In particular, for instance, if a toggle key 403-1 is selected as 'TV only', the controller 180 may control the content 420 (e.g., broadcast data, etc.) received from the external terminal 200 to be displayed via the touchscreen 151 [FIG. 4B (b)-1]. For another instance, if the toggle key 403-1 is selected as 'TV+My Phone', the controller 180 may control both of the content 410 saved in the terminal 100 and the content 420 received from the external terminal 200 to be simultaneously displayed on the touchscreen 151 [FIG. 4B (b)-2].

Referring to FIG. 4C, a tab 'Transparent Layer' 405 may be provided to display a transparent handwriting layer only without displaying a content saved in the terminal 100 and a content received from the external terminal 200. While the tab 'Transparent Layer' 405 is active, if a user applies a touch input to the touchscreen 151, the controller 180 controls a user's handwriting to be displayed in a manner of displaying a trace of the touch input on the transparent handwriting layer.

Referring now to FIG. 3, if a user's touch input is applied to the touchscreen 151 [S303], the controller 180 may be able to control a trace of the touch input to be displayed via at least one of the touchscreen 151 and the external terminal 200 [S304]. In particular, the controller 180 displays the trace of the touch input on at least one of the touchscreen 151 and the external terminal 200, thereby controlling a result of the handwriting action to be displayed. In more particular, the controller 180 may control the trace of the touch input to be displayed on the touchscreen 151 only, may control the trace of the touch input to be displayed not on the touchscreen 151 but on the external terminal 200, or may control the trace of the touch input to be simultaneously displayed on each of the touchscreen 151 and the external terminal 200. A process for displaying the handwriting result on at least one of the touchscreen and the external terminal 200 is described in detail with reference to the accompanying drawings as follows.

Figure 5B:
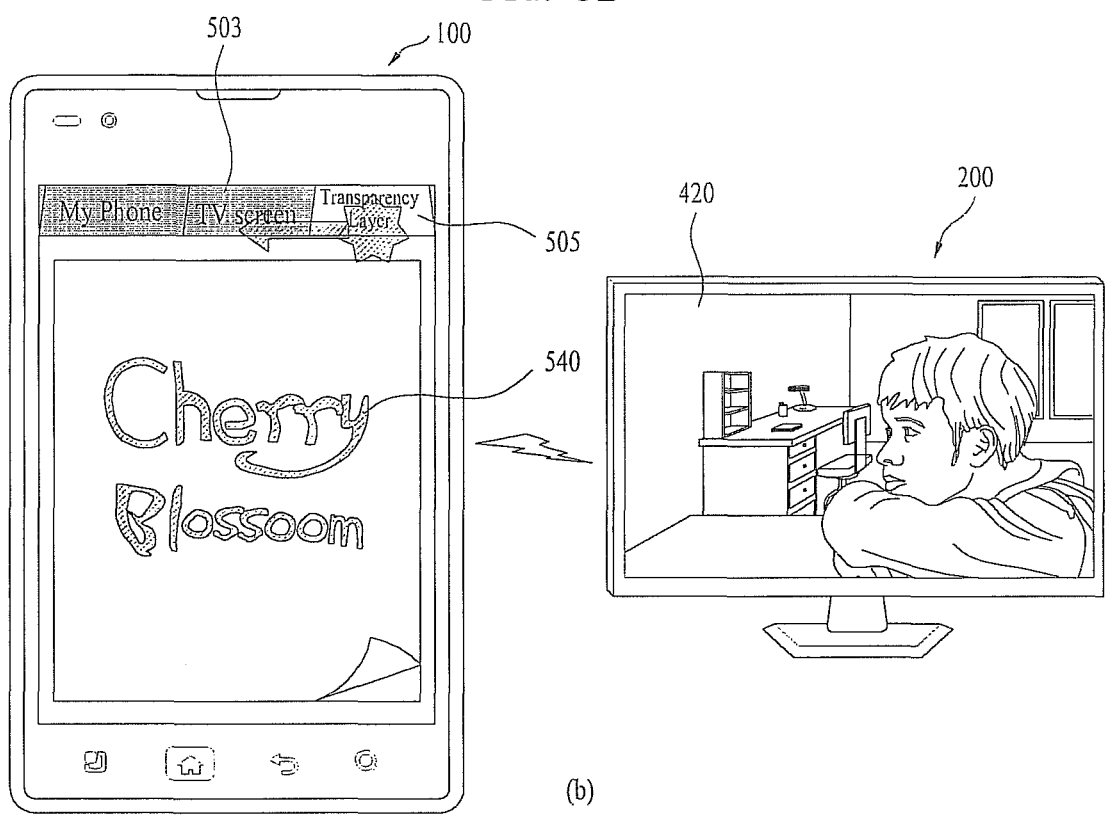

FIGS. 5A to 5C are diagrams of display screen configurations for one example to describe a process for displaying a handwriting input on at least one of a touchscreen and an external terminal using an activation tab shown in FIG. 4.

Referring to FIG. 5A, while the tab 'Transparent Layer' 505 is in an active state, if a touch input is applied to the touchscreen 151, the controller 180 may be able to control a trace 540 of the touch input to be displayed on a handwriting layer [FIG. 5A (a)-1]. Subsequently, if the tab 'Transparent Layer' 505 is dragged to the tab 'My Phone' 501 [FIG. 5A (a)-1], the controller 180 controls a trace 540 of the touch input not to be displayed on the external terminal 200 and also controls the trace 540 of the touch input to be displayed in the content 510 displayed via the terminal 100 [FIG. 5A (a)-2].

On the other hand, if the tab 'Transparent Layer' 505 is dragged to the tab 'TV Screen' 503 [FIG. 5B], the controller 180 controls the trace 540 of the touch input not to be displayed on the terminal 100 and also controls the trace 540 of the touch input to be displayed in the content 520 outputted via the external terminal 200 [FIG. 5C (c)-1]. In the former example described with reference to FIG. 4B (b)-2, if the toggle key 403-1 provided by the tab 'TV Screen' 503 is set to 'TV+My phone', the controller 180 may control the trace 540 of the touch input to be displayed in each of the content 520 outputted via the external terminal 200 and the content 510 outputted via the touchscreen 151 [FIG. 5C (c)-2].

In particular, the controller 180 may determine a terminal which is configured to display a trace of a touch input based on a user command (e.g., a position of drag & drop in the handwriting layer shown in FIG. 5) applied to a handwriting layer having the touch input displayed thereon.

Figure 6A:
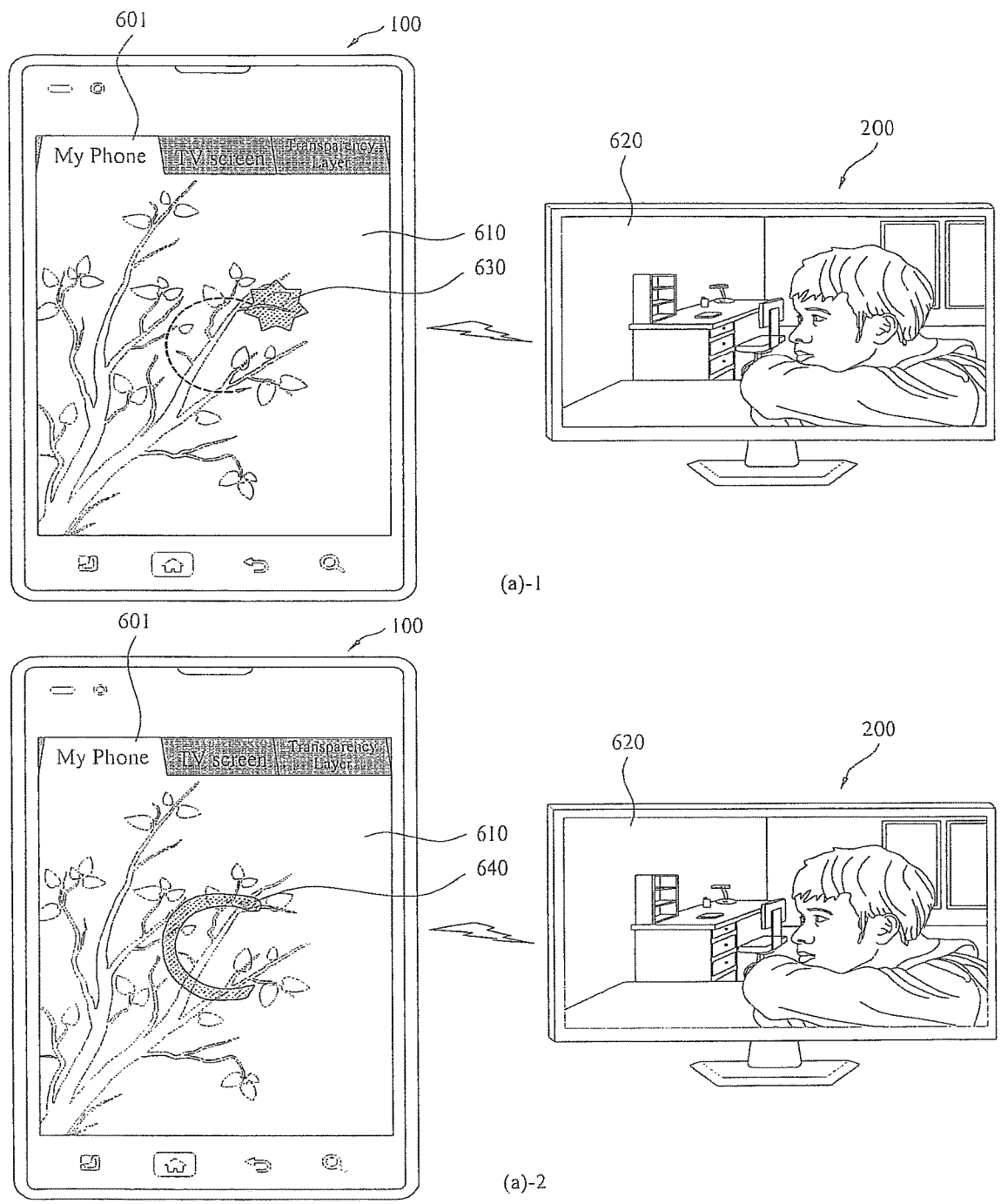

FIGS. 6A to 6C are diagrams of display screen configurations for another example to describe a process for displaying a handwriting input result on at least one of a touchscreen and an external terminal using an activation tab shown in FIG. 4.

Referring to FIG. 6A, while a tab 'My Phone' 601 is in an active state, if a touch input 630 is applied to the touchscreen 151 [FIG. 6A (a)-1], the controller 180 may control a trace 640 of the touch input to be displayed on a content 610 outputted via the touchscreen 151 only [FIG. 6A (a)-2]. In particular, while the different contents 610 and 620 are being displayed on the touchscreen 151 and the external terminal 200, respectively, if the touch input is applied, the controller 180 may be able to control the trace 640 of the touch input to be displayed on the content 610 outputted via the touchscreen 151 only.

For another instance, while a tab 'TV Screen' 603 is in an active state, if a touch input 630 is applied to the touchscreen 151 [FIG. 6B], the controller 180 may control a trace 640 of the touch input to be displayed on a content 620 outputted by the external terminal 200 only [FIG. 6C (c)-1]. Even if the touch input 630 is applied to the touchscreen 151 while the tab 'TV Screen' is active, as mentioned in the foregoing description with reference to FIG. 4B (b)-2, if the toggle key 403-1 is set to the state 'TV+My phone', it may be able to control the trace 640 of the touch input to be displayed on each of the content 620 outputted via the terminal 100 and the content 610 outputted via the external terminal 200 [FIG. 6C (c)-2].

In particular, in case that while each of the touchscreen 151 and the external terminal 200 is outputting the same content (e.g., the broadcast data is being displayed on each of the touchscreen 151 and the external terminal 200 in the example shown in FIG. 6), as shown in FIG. 6B or FIG. 6C, the controller 180 may control the trace of the touch input to be displayed in the content provided by the external terminal 200 only or may control the trace of the touch input to be displayed in the content provided by each of the external terminal 100 and the touchscreen 151.

In the examples shown in FIG. 5 and FIG. 6, the displayed position of the handwriting input is adjusted using the activation tab shown in FIG. 4. Alternatively, for example, the controller 180 may be able to adjust a displayed position of a handwriting input based on a setting value saved in the memory 160. This is described in detail with reference to FIG. 7 as follows.

Figure 7B:
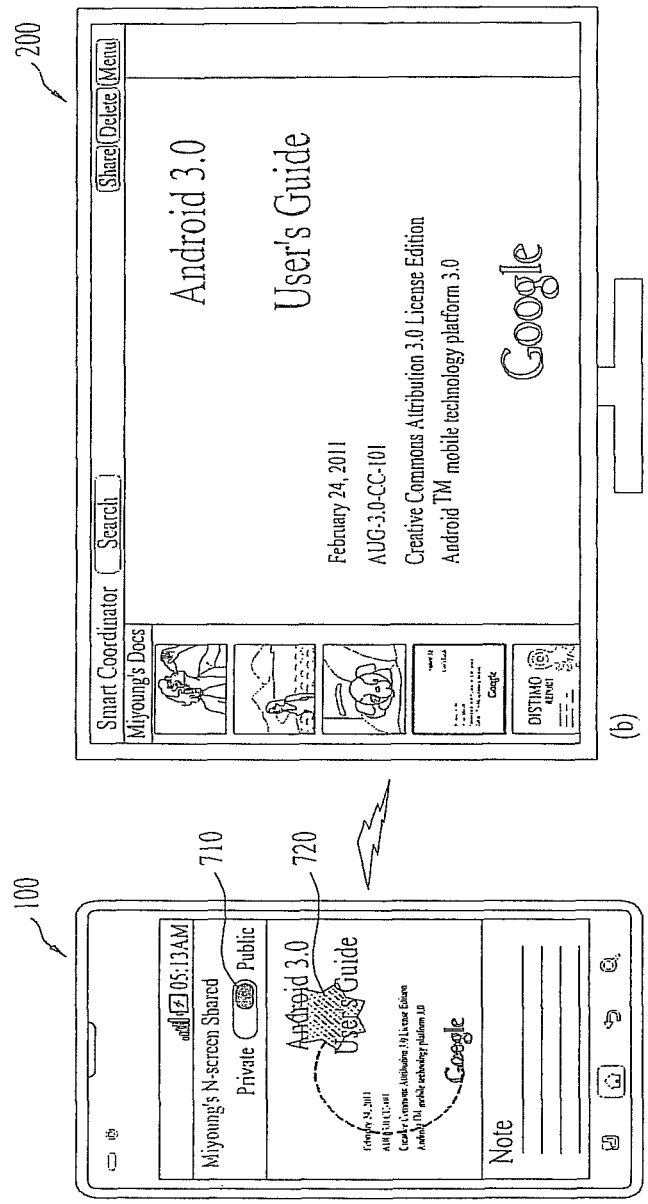
Figure 7C:
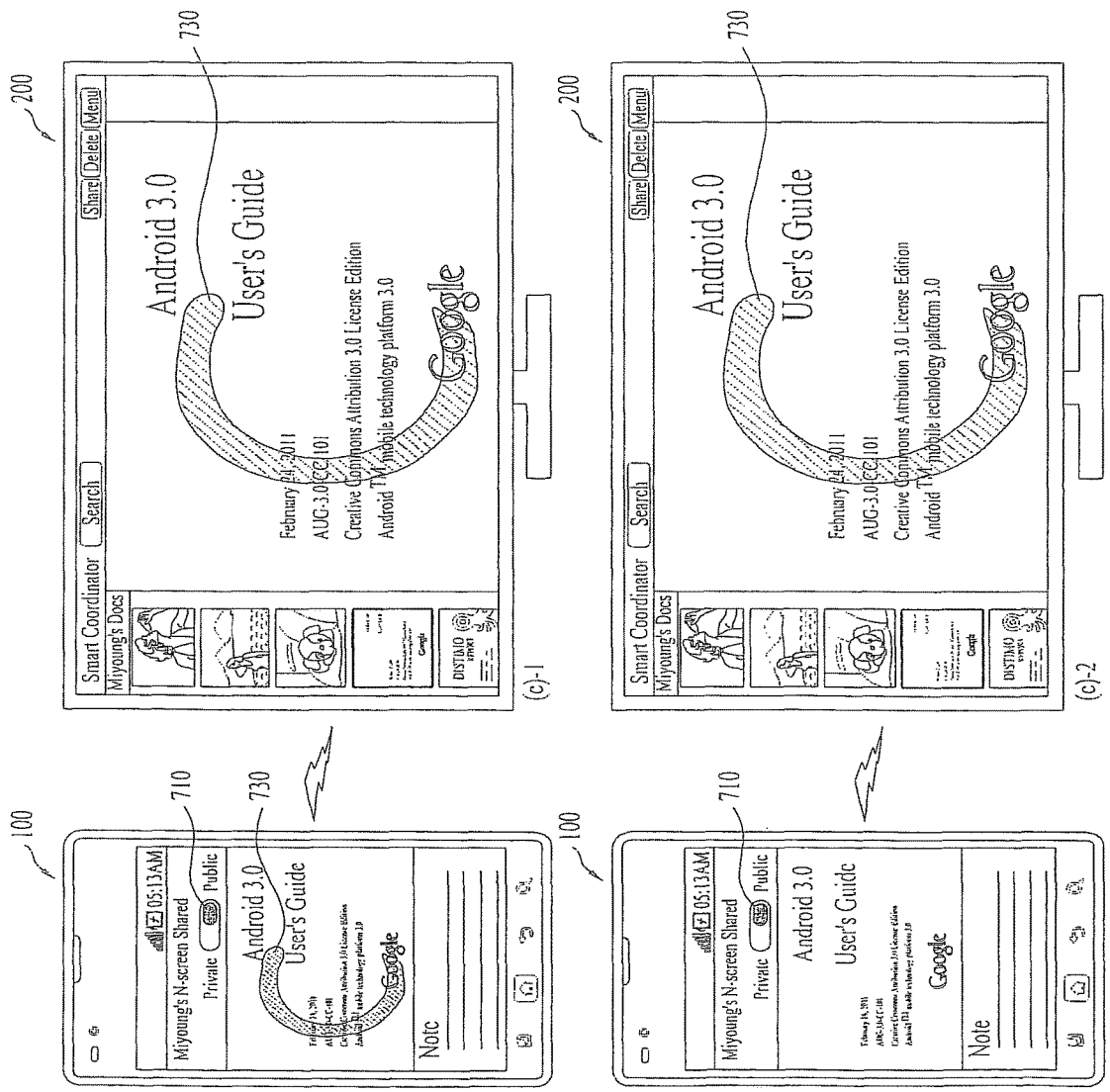

FIGS. 7A to 7C are diagrams of display screen configurations for another example to describe a process for displaying a handwriting input result on at least one of a touchscreen and an external terminal using an activation tab shown in FIG. 4.

Referring to FIGS. 7A to 7C, using a toggle key 710, a user is able to determine whether to use a handwriting input, which will be displayed on the touchscreen 15, for a private usage or a public usage to share with another user. For instance, while a state of a toggle key 710 is set to a state 'Private', if a touch input 720 is applied [FIG. 7A (a)-1], the controller 180 may be able to control a trace 730 of the touch input to be displayed on the touchscreen 151 only [FIG. 7A (a)-2]. On the other hand, while a state of the toggle key 710 is set to a state 'Public', if a touch input 720 is applied [FIG. 7B], the controller 180 may control a trace 730 of the touch input to be displayed on each of the touchscreen 151 and the external device 200 simultaneously [FIG. 7C (c)-1] or on the external terminal 200 only [FIG. 7C (c)-2].

In particular, while the handwriting input is set not to shared, if a touch input is applied (e.g., the state of the toggle key 710 is set to 'Private' in FIG. 7), the controller 180 may be able to control a trace of the touch input to be displayed on the touchscreen 151 only. On the other hand, while the handwriting input is set to be shared, if a touch input is applied (e.g., the state of the toggle key 710 is set to 'Public' in FIG. 7), the controller 180 may be able to control a trace of the touch input to be displayed on each of the touchscreen 151 and the external terminal 200 simultaneously or on the external terminal 200 only.

In the examples shown in FIGS. 7A to 7C, the touch input is applied while the same content is being displayed on each of the terminal 100 and the external terminal 200. Yet, it may be unnecessary for each of the terminal 100 and the external terminal 200 to display the same content. Despite that different contents are displayed on the terminal 100 and the external terminal 200, respectively, if the terminal 100 and the external terminal 200 are set to share handwriting inputs with each other (e.g., if the state of the toggle key 710 is set to 'Public'), a trace of a touch input may be displayed on the external terminal 200.

In the examples mentioned in the above description, the terminal 100 establishes a wireless network with a single external terminal 200 only. Yet, it may be unnecessary for the terminal 100 and the external terminal 200 to perform one-to-one communication only. And, the terminal 100 may be able to configure a wireless network with a plurality of external terminals 200.

For instance, while the terminal 100 is configuring a wireless network with a first external terminal 200, if a second external terminal 200 makes a request for an access to the wireless network, the terminal 100 may accept or reject the request made by the second external terminal 200. A trace of a touch input from the second external terminal 200 is displayed on the first external terminal 200, the first external terminal 200 may display the results of the handwritings performed on the terminal 100 and the second external terminal. Hence, in order to prevent a handwriting action of a user of the terminal 100 from being interrupted, the access requested by the end external terminal 200 may need an approval of the first external terminal 200.

Once the second external terminal 200 is admitted into the wireless network, the controller 180 may display a content outputted via the second external terminal 200 or may be able to control the trace of the touch input to be further displayed on the second external terminal 200.

Figure 8:
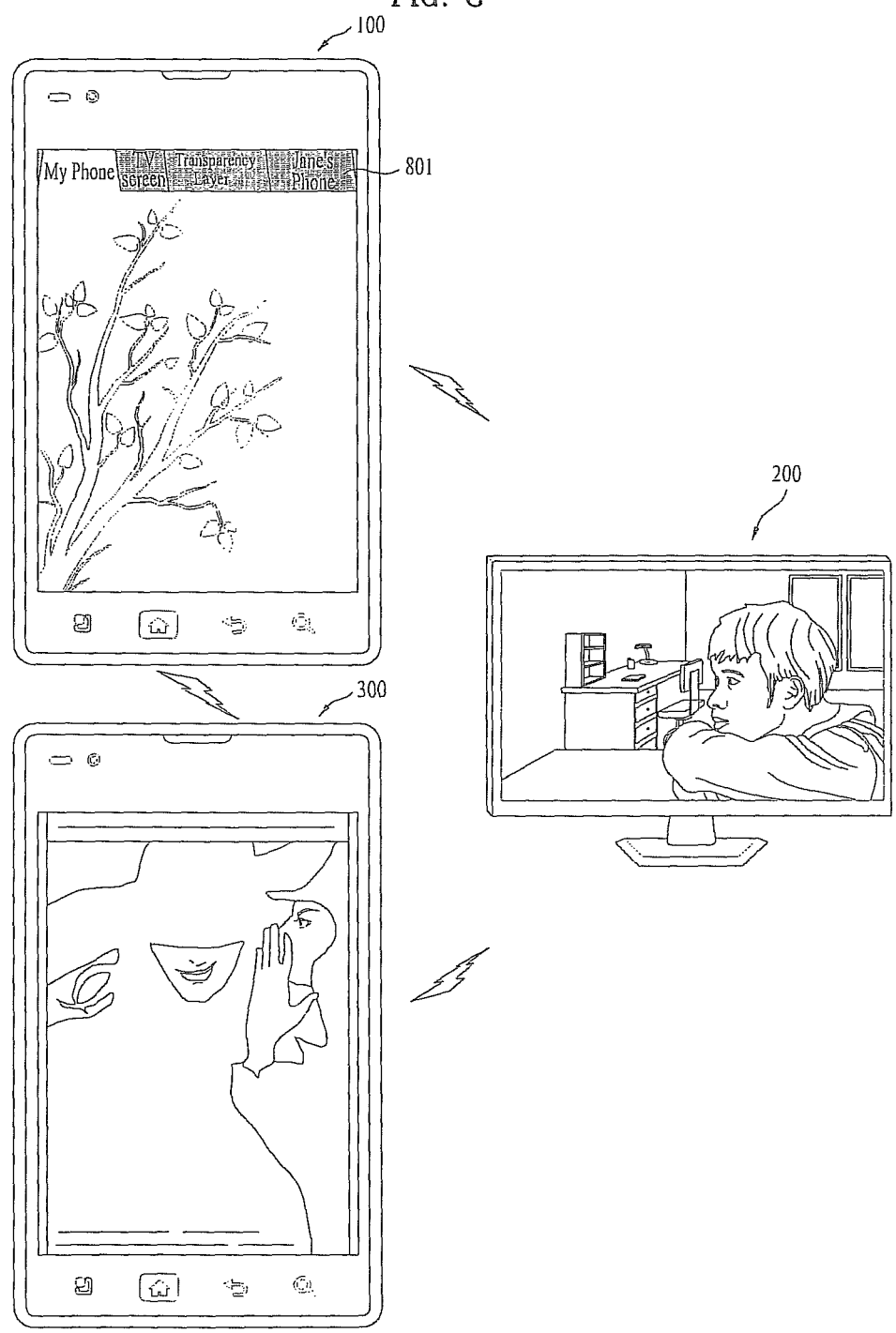
FIG. 8 is a diagram of display configuration for one example to describe a process for displaying a handwriting input on a second external terminal.

FIG. 8 is a diagram of display configuration for one example to describe a process for displaying a handwriting input on a second external terminal. For clarity of the following description with reference to FIG. 8, a second external terminal 300 shall be named Jane's Phone. In case that the second external terminal 300 is newly admitted into a wireless network, the controller 180 extends the screen shown in FIG. 4 and may control a menu tab 801, which indicates the newly connected second external terminal 300, to be further displayed thereon. Referring to FIG. 8, the menu tab 801 named 'Jane's Phone' is further displayed. In doing so, if the tab 'Jane's Phone' 801 is activated, the controller 180 may control a content, which is outputted by the second external terminal 200, to be further displayed. Thereafter, as mentioned in the foregoing descriptions with reference to FIG. 5 and FIG. 6, if 'Transparent Tab' having a handwriting result displayed thereon is dragged to the tab 'Jane's Phone' or a touch input is applied in the active tab 'Jane's Phone', the controller 180 may control the trace of the touch input to be displayed via the second external terminal 300.

In case that the terminal 100 is set to share handwriting inputs, as mentioned in the foregoing description with reference to FIG. 7, the controller 180 may control the trace of the touch input to be displayed on the second external terminal 300 as well as one the first external terminal 200.

In the following description, the second sharing method is described in detail with reference to the accompanying drawings.

Figure 9:
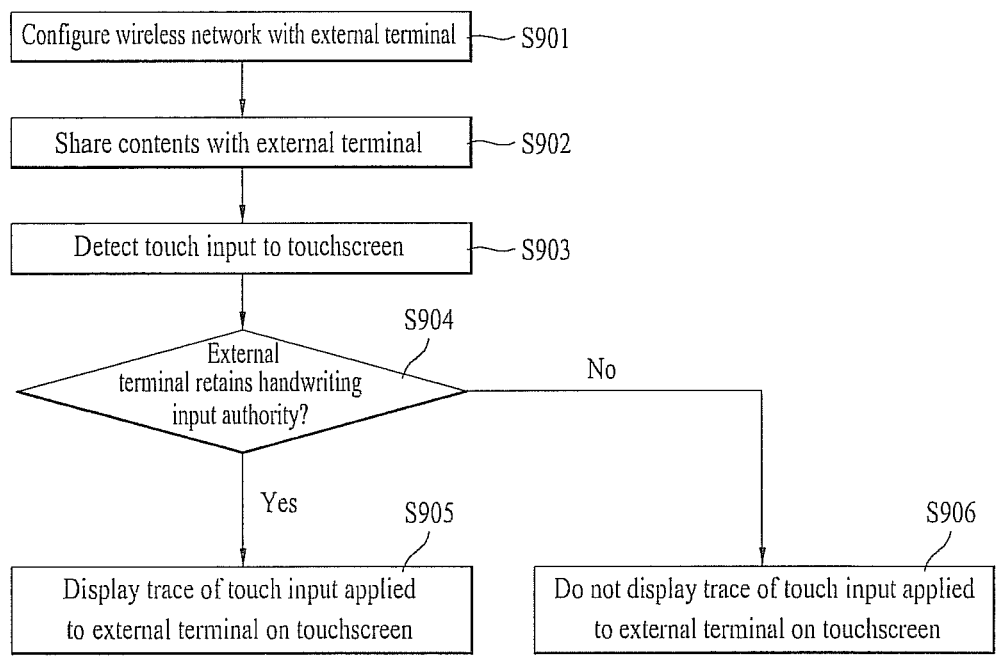
FIG. 9 is a control flowchart of a second sharing method according to the present invention.

FIG. 9 is a control flowchart of a second sharing method according to the present invention.

Referring to FIG. 9, a terminal 100 may be able to establish a wireless network with an external terminal 200 using the wireless communication unit 110 under the control of the controller 180 [S901]. Once the wireless network with the external terminal 200 is established, the controller 180 may control each of the touchscreen 151 and the external terminal 200 to output the same content or may control the touchscreen 151 and the external terminal 200 to output different contents, respectively. In case that the touchscreen 151 and the external terminal 200 are set to output the same content, the controller 180 may control a content saved in the memory 160 to be shared with the external terminal 200 or may be set to share a content saved in the external terminal 200 [S902].

Figure 10:
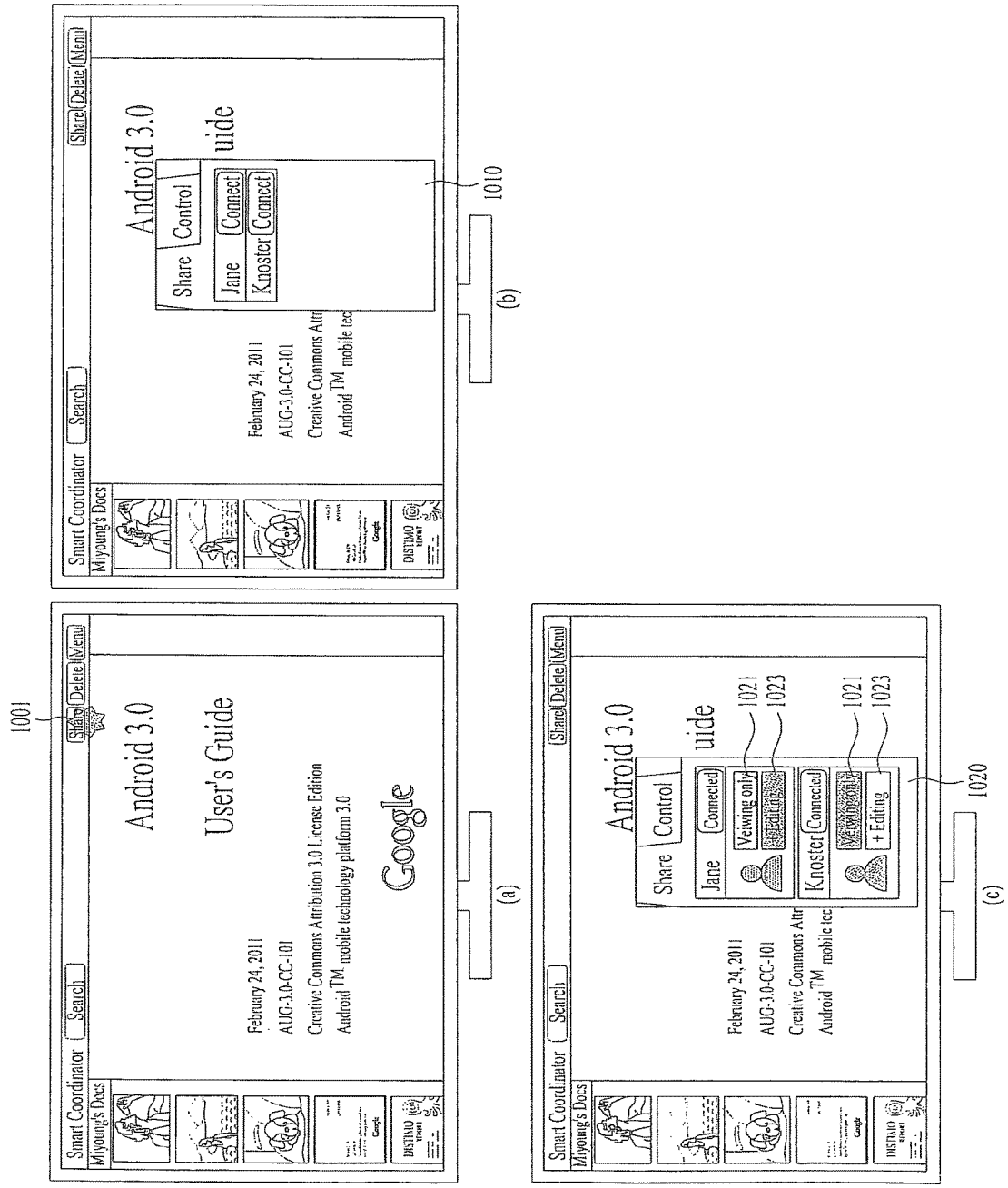
FIG. 10 is a diagram of display configuration for one example of a touchscreen output provided to share a content saved in a terminal with an external terminal.

FIG. 10 is a diagram of display configuration for one example of a touchscreen output provided to share a content saved in a terminal with an external terminal.

Referring to FIG. 10, if a button 'Share' is selected [1001] [FIG. 10 (a)], the controller 180 may control an external terminal list 1010 of external terminals, with which a wireless network is established, to be displayed [FIG. 10 (b)]. The controller 180 may be then able to select the external terminal 200, with which the content saved in the memory 160 will be shared, from the list shown in FIG. 10 (b). In the example shown in FIG. 10 (b), an external terminal 200 named 'Jane' and an external terminal 200 named 'Knoster' establish the wireless network with the terminal 100.

If the external terminal 200, with which a content will be shared, is selected, referring to FIG. 10 (c), the controller 180 may be able to display a menu screen 1020 to determine whether to grant a handwriting input authority to the external terminal 200, with which the content will be shared, based on a user input. In the example shown in FIG. 10 (c), a button 'Viewing Only' 1021 is provided not to grant the handwriting input authority to the external terminal 200, whereas a button 'Editing' 1023 is provided to grant the handwriting input authority to the external terminal 200. In the example shown in FIG. 10 (c), since the external terminal named Jane has the button 'Editing' 1023 activated and the external terminal 200 named Knoster has the button 'Viewing Only' 1021 activated, the external terminal 200 named Jane is understood as having the handwriting input authority granted thereto and the external terminal 200 named Knoster is understood as having the handwriting input authority not granted thereto.

Yet, it may be unnecessary for each of the touchscreen 151 and the external terminal 200 to output the same content. Even if the touchscreen 151 and the external terminal 200 output different contents, respectively, a handwriting result via the external terminal 200 may be outputted via the touchscreen 151. In case that the touchscreen 151 and the external terminal 200 output the different contents, respectively, the step S902 shown in FIG. 9 can be skipped.

The controller 180 of the terminal 100 according to the present invention may be able to control an object, which represents the external terminal 200 forming a wireless network with the wireless communication unit 110, to be displayed via the touchscreen 151. Moreover, the controller 180 may be able to control an object representing the handwriting input authority granted external terminal 200 and an object representing the handwriting input authority non-granted external terminal 100 to be visually discriminated from each other. In this case, the object may include such an indicator capable of indicating a connection to the external terminal 200 as an icon, a cursor, an image, a text and the like. For clarity of the following description, assume that the object representing the external terminal 200 is displayed as an icon.

Figure 11:
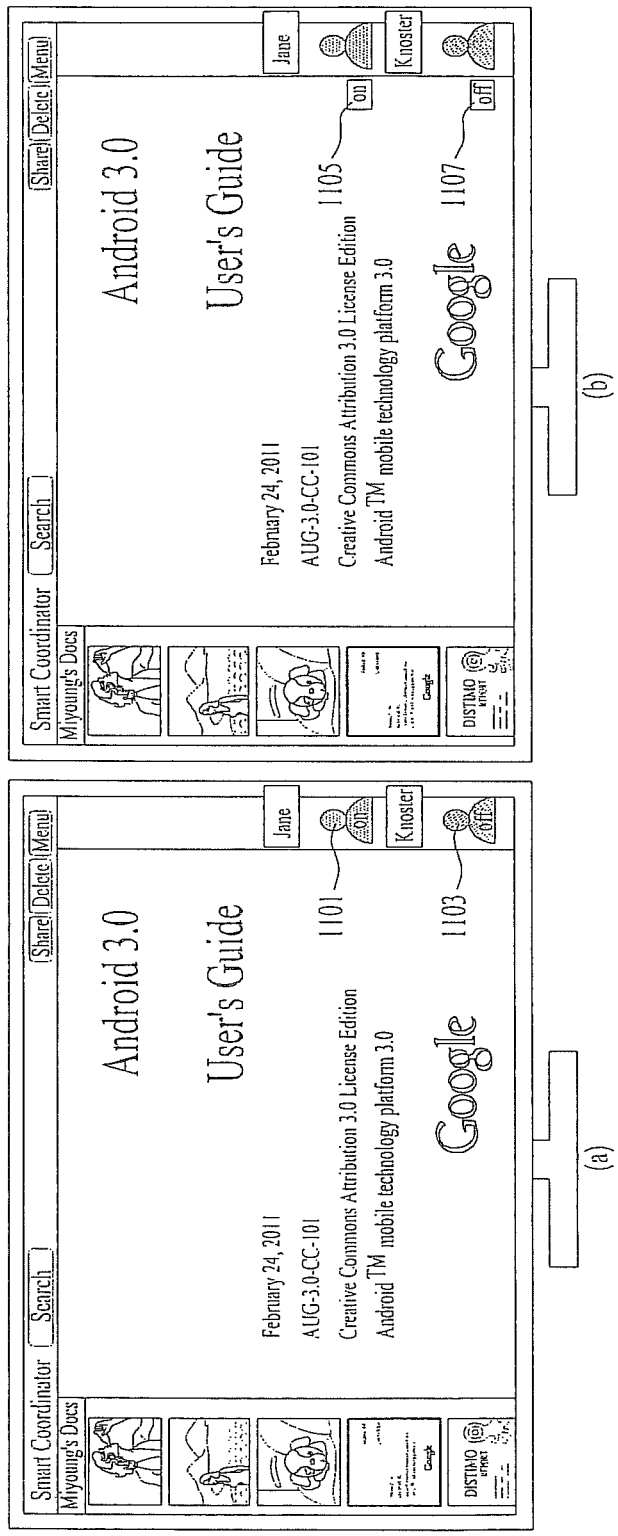
FIG. 11 is a diagram of display configuration for one example to describe a process for displaying an icon, which represents an external terminal belonging to the same wireless network on a touchscreen.

FIG. 11 is a diagram of display configuration for one example to describe a process for displaying an icon, which represents an external terminal belonging to the same wireless network on a touchscreen.

Referring to FIG. 11 (a), an icon 1101 representing an external terminal 200 named Jane and an icon 1103 representing an external terminal 200 named Knoster are outputted via the touchscreen 151. In doing so, the icon 1101 representing the external terminal 'Jane' 200 having a handwriting input authority granted thereto and the icon 1103 representing the external terminal 'Knoster' 200 having the handwriting input authority not granted thereto are visually discriminated from each other. In particular, 'On' or 'Off' is inscribed within the corresponding icon for the visual discrimination [FIG. 11 (a)]. Hence, a user is able to easily recognize the external terminal 200 configuring the wireless network and determine whether the handwriting input authority is granted to the corresponding external terminal 200, via the icon outputted via the touchscreen 151.

In the example shown in FIG. 11 (a), the icon 1101 of the handwriting input authority granted external terminal 200 and the icon 1103 of the handwriting input authority non-granted external terminal 200 differ from each other in a displayed form. Yet, it may be unnecessary to use the icons in discriminating whether the handwriting input authority is granted. For instance, referring to FIG. 11 (b), the controller 180 may facilitate the recognition of a presence or non-presence of the handwriting input authority grant in a manner of controlling different indicators 1105 and 1107 to be displayed around the icon 1101 representing the handwriting input authority granted external terminal 200 and the icon 1103 representing the handwriting input authority non-granted external terminal, respectively.

Moreover, while the wireless network is configured with the external terminal 200, the controller 180 may be able to control a real-time monitoring image of the external terminal 200 to be outputted via the touchscreen 151. By displaying the real-time monitoring image, a handwriting content drawn on the external terminal 200 is checked and outputs of the touchscreen 151 and the external terminal 200 can be compared to each other.

Figure 12:
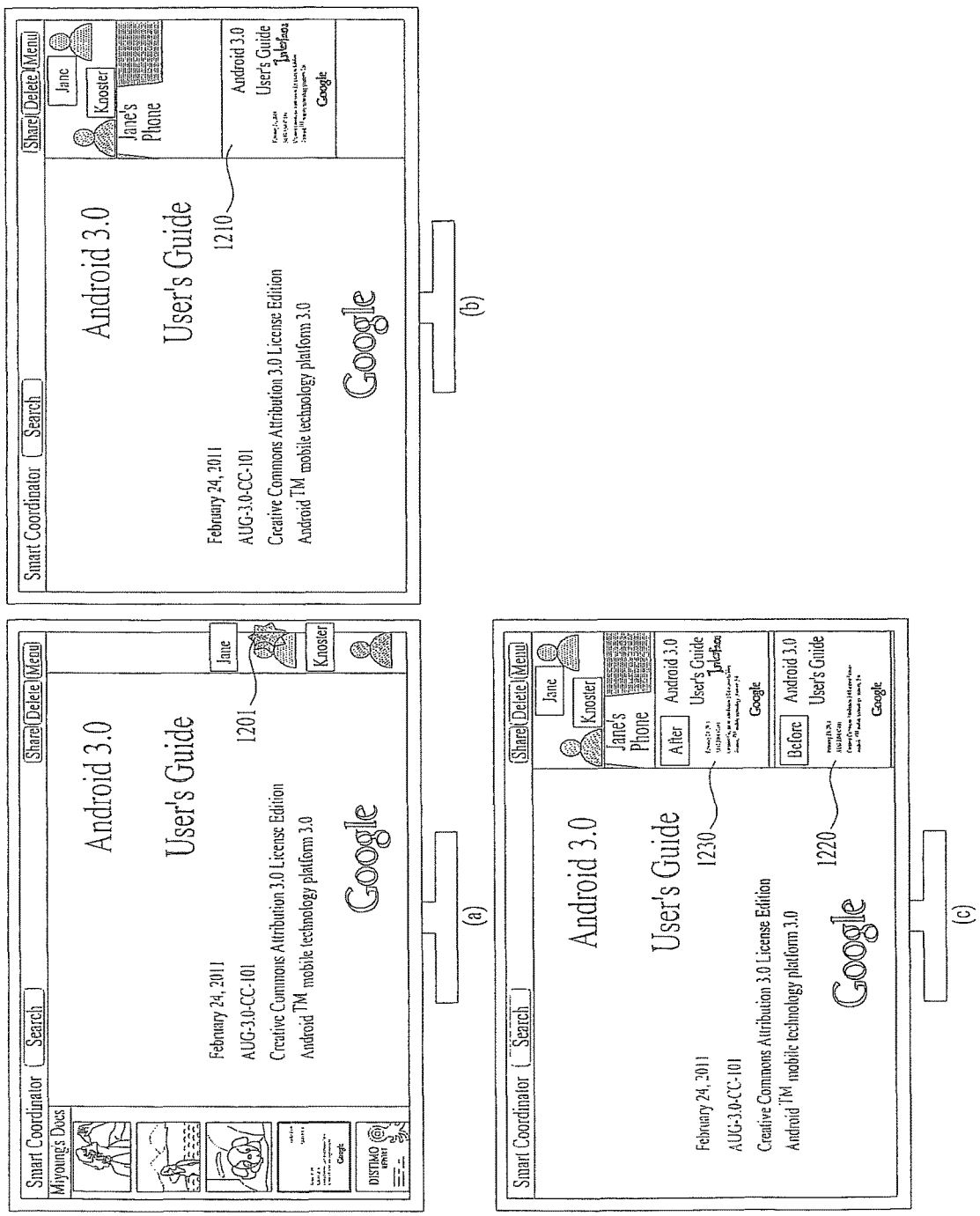
FIG. 12 is a diagram of display configuration for one example of outputting a monitoring image of an external terminal.

FIG. 12 is a diagram of display configuration for one example of outputting a monitoring image of an external terminal.

Referring to FIG. 12, the terminal 100 configures a wireless network with an external terminal 200 named Jane and an external terminal 200 named Knoster. In doing so, if a user selects an icon representing the external terminal 'Jane' 200 [1201] [FIG. 12 (a)], the controller 180 may be able to control a real-time output image 1210 of the external terminal 'Jane' 200 to be displayed [FIG. 12 (b)]. By displaying the real-time output image 1210 of the external terminal 200, as shown in FIG. 12 (b), it may be able to check a real-time output of the external terminal 200. Through this, a user may be able to check a handwriting content failing to be drawn on the touchscreen 151 despite being displayed on the external terminal 200.

Moreover, even if a handwriting is drawn on the handwriting input authority non-granted external terminal 200, a user may use a monitoring image of the corresponding external terminal 200 to check a prescribed content of the corresponding handwriting.

The controller 180 may be able to configure a monitoring image to compare screens before and after a handwriting activity through the external terminal 200. For instance, referring to FIG. 12 (c), an output image 1220 of the external terminal 200 before a touch input and a real-time output image 1230 of the external terminal 200 having an ongoing touch input applied thereto can be simultaneously outputted via the touchscreen 151 under the control of the controller 180. Thus, the screen configuration change attributed to the handwriting can be easily recognizable if the output image 1220 of the external terminal 200 before applying the touch input to the external terminal 200 and the real-time output image 1230 of the external terminal 200 having the ongoing touch input applied thereto are simultaneously displayed on the touchscreen 151.

In case that a trace of a touch input applied to the external terminal 200 is displayed on the touchscreen 151 as well as on the external terminal 200, the controller 180 may be able to control a monitoring image not to be displayed on the touchscreen 151 while the trace of the touch input is being drawn. This is to prevent the trace of the touch input drawn on the touchscreen 151 from being blocked by the monitoring image.

Figure 13:
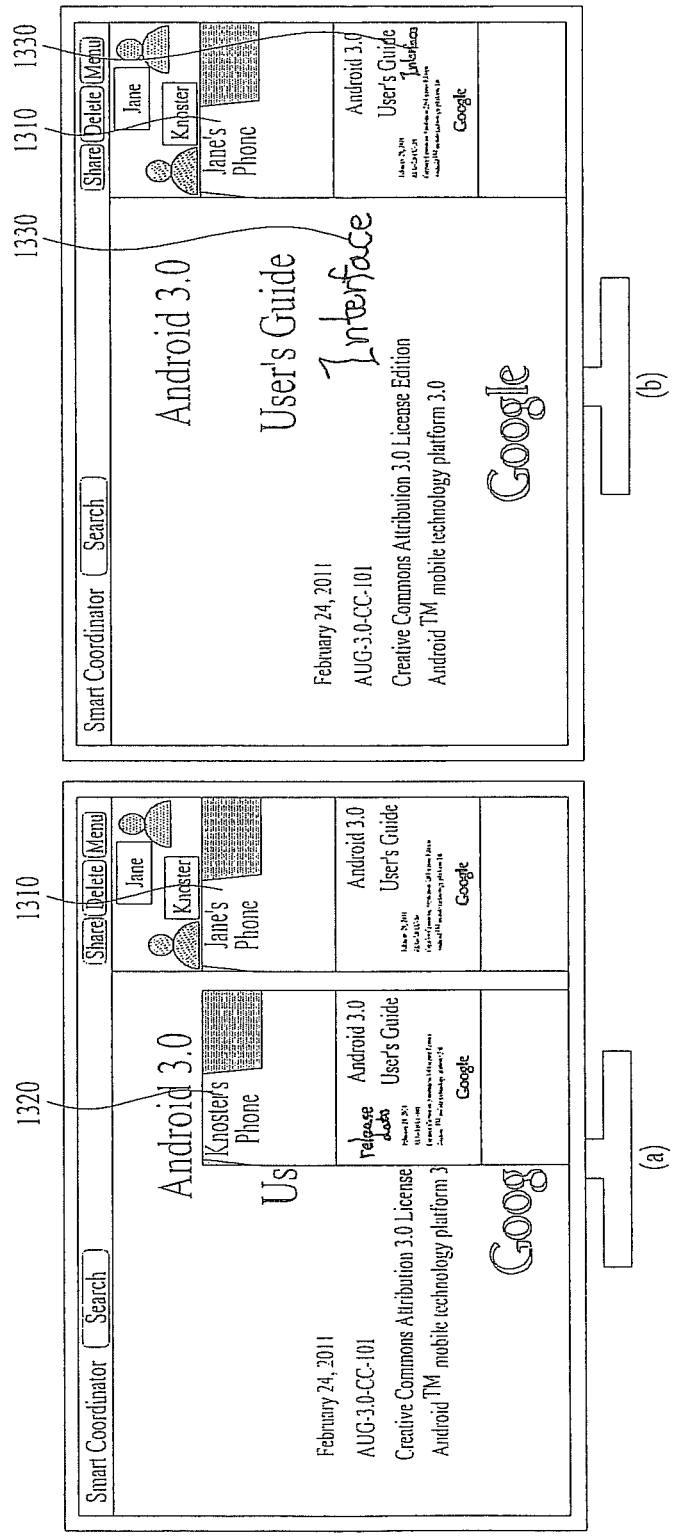
FIG. 13 is a diagram of display configuration for one example to describe that a monitoring image stops being displayed in the course of displaying a trace of a touch input on a touchscreen.

FIG. 13 is a diagram of display configuration for one example to describe that a monitoring image stops being displayed in the course of displaying a trace of a touch input on a touchscreen.

Referring to FIG. 13, a monitoring image 1310 of an external terminal 200 named Jane and a monitoring image 1320 of an external terminal 200 named Knoster are displayed on the touchscreen 151. Referring to FIG. 13 (a), a portion of a content outputted via the touchscreen 151 may be blocked by the monitoring image (e.g., the portion of the content is blocked by the monitoring image 1320 of Knoster). If a touch input is detected from the external terminal Jane 200 retaining a handwriting input authority, the controller 180 may control a trace 1330 of the touch input to be displayed on the touchscreen 151. In doing so, in order to prevent a trace of a handwriting input to be blocked by the monitoring image, referring to FIG. 13 (b), the controller 180 may control an output of the monitoring image (e.g., the monitoring image 1320 of Knoster in FIG. 13 (b)), which interrupts the output of the content, to be stopped while the trace 1330 of the touch input is being drawn.

Referring now to FIG. 9, if a user's touch input is applied to the external terminal 200 [S903], the controller 180 may be able to determine whether the touch input applied to the external terminal 200 retains a handwriting input authority [S904]. If the touch input is applied via the handwriting input authority granted external terminal 200, the controller 180 may control a trace of the touch input to be outputted via the touchscreen 151 [S905]. On the other hand, if the touch input is applied to the handwriting input authority non-granted external terminal 200, the controller 180 may control the trace of the touch input not to be outputted via the touchscreen 151 [S906].

In the example shown in FIG. 10, if the touch input is applied via the handwriting input authority granted external terminal 200 named Jane, the controller 180 may control the trace of the touch input to be outputted to the touchscreen 151. On the other hand, in the example shown in FIG. 10, if the touch input is applied via the handwriting input authority non-granted external terminal 200 named Knoster, the controller 180 may control the trace of the touch input not to be displayed on the touchscreen 151.

In order to display a trace of a touch input applied via the handwriting input authority granted external terminal 200, the wireless communication unit 110 may be able to receive a handwriting layer or coordinates information of the touch input from the external terminal 200. The controller 180 may control the handwriting layer received via the wireless communication unit 110 to be outputted via the touchscreen 151 or may control the touch input trace to be displayed on the touchscreen 151 in a manner that a point matching the coordinated information is visually identifiable. Moreover, in case that the external terminal 200 and the touchscreen 151 differ from each other in specifications, the controller 180 may be able to control a display size of the trace of the touch input received from the external terminal 200 to fit the specifications of the touchscreen 151 appropriately. For instance, if the size of the touchscreen 151 of the external terminal 200 is 1 inch and the size of the touchscreen 151 of the terminal 100 is 2 inches, the terminal 100 displays the trace of the touch input twice larger than the external terminal 200 does. In particular, the controller 180 may be able to adjust a display size of the handwriting result based on a ratio of resolution, screen size or the like between the external terminal 200 and the touchscreen 151.

Yet, in case that a touch input is applied to the handwriting input authority granted external terminal 200, it may be unnecessary for a trace of the touch input to be displayed via the touchscreen 151. In case that a user of the handwriting input authority granted external terminal 200 sets a handwriting input not to be shared, the controller 180 may control a trace of the touch input applied via the external terminal 200 not to be displayed on the touchscreen 151. For instance, as mentioned in the foregoing description with reference to FIG. 7 for the first sharing method, if the touch input is applied in the state that the handwriting input authority granted external terminal 200 is set not to share the handwriting input (e.g., the toggle key is set to 'Private'), a trace of the touch input applied to the external terminal 200 may not be provided to the wireless communication unit 110 or may not be outputted via the touchscreen 151 despite being provided to the wireless communication unit 110. On the contrary, if the touch input is applied in the state that the handwriting input authority granted external terminal 200 is set to share the handwriting input (e.g., the toggle key is set to 'Public'), the trace of the touch input applied to the external terminal 200 may be received and then displayed via the touchscreen 151.

In case that a touch input is applied via the external terminal 200, the controller 180 may control an indicator to be outputted via the touchscreen 151 to indicate that the touch input is being applied to the external terminal 200 via the touchscreen 151.

Figure 14:
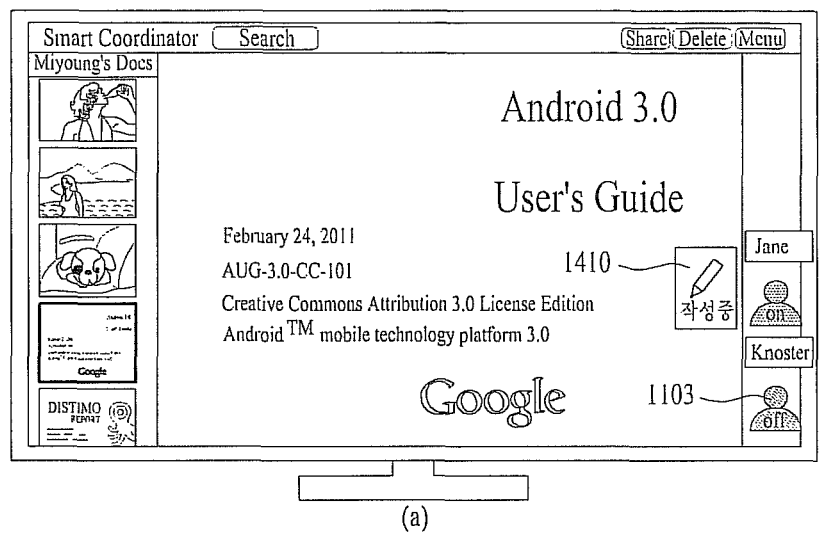
FIG. 14 is a diagram of display configuration for one example of displaying an indicator indicating that a touch input is being applied to an external terminal.

FIG. 14 is a diagram of display configuration for one example of displaying an indicator indicating that a touch input is being applied to an external terminal.

Referring to FIG. 14, the terminal 100 configures a wireless network with an external terminal 200 named Jane and an external terminal 200 named Knoster. In case that a touch input is applied via the external terminal Jane 200, the controller 180 may control an indicator 1410 to be displayed around an icon representing the external terminal 200 named Jane to indicate that the touch input is being applied.

In the example shown in FIG. 14, a touch input trace from one external terminal 200 is displayed on the touchscreen 151. Yet, it may be unnecessary for a handwriting result from one external terminal 200 to be displayed on the touchscreen 151. And, it is a matter of course that handwriting results from a plurality of external terminals 200 can be outputted on the touchscreen 151.

In case that touch input traces from a plurality of external terminals are displayed on the touchscreen 151, the controller 180 may control the touch input traces to be displayed on the touchscreen 151 in a manner that different visual effects are given to a plurality of the external terminals 200, respectively. For instance, in case that a trace of a first touch input applied via a first external terminal 200 and a trace of a second touch input applied via a second external terminal 200 are displayed on the touchscreen, the controller 180 may control the trace of the first touch input and the trace of the second touch input to be displayed in a first color and a second color, respectively.

Figure 15:
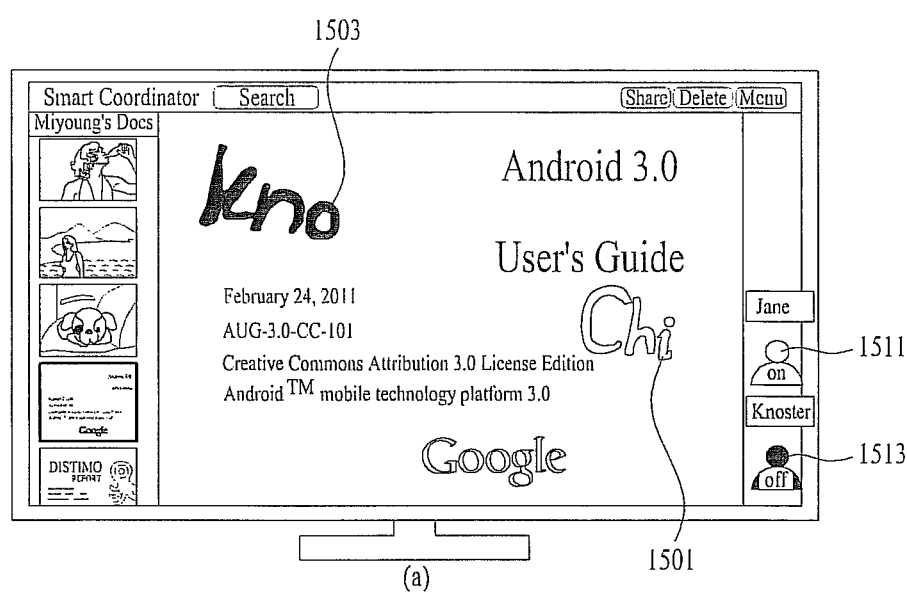
FIG. 15 is a diagram of display configuration for one example of giving different visual effects to traces of first and second touch inputs, respectively.

FIG. 15 is a diagram of display configuration for one example of giving different visual effects to traces of first and second touch inputs, respectively. In FIG. 15, assume that a handwriting input authority is granted to each of an external terminal 200 named Jane and an external terminal 200 named Knoster.

Referring to FIG. 15, if a first touch input is applied via the external terminal 200 named Jane, the controller 180 may be able to control a trace 1501 of the first touch input to be displayed in a first color on the touchscreen 151. If a second touch input is applied via the external terminal 200 named Knoster, the controller 180 may be able to control a trace 1503 of the second touch input to be displayed in a second color on the touchscreen 151.

Moreover, the controller 180 may be able to control colors of icons 1511 and 1513 representing the external terminals 200 to match the colors of the touch input traces displayed on the touchscreen 151, respectively. For instance, the icon 1511 representing the external terminal 200 named Jane may be displayed in the first color on the touchscreen 151 and the icon 1513 representing the external terminal 200 named Knoster may be displayed in the second color on the touchscreen 151.

FIG. 15 shows the example that the different colors are given as visual effects to discriminate the handwritings of a plurality of the external terminals 200 from one another, respectively, by which the present invention may be non-limited. For instance, the traces of the first and second touch inputs may be visually discriminated from each other through at least one of various visual effects including different patterns, different thicknesses, different transparencies and the like.

Moreover, even if the touch input traces from a plurality of the external terminals 200 are displayed on the touchscreen 151, the controller 180 may be able to selectively display the touch input trace from at least one of a plurality of the external terminals 200 in response to a user input. For instance, in case that a trace of a first touch input inputted via a first external terminal 200 and a trace of a second touch input inputted via a second external terminal 200 are displayed on the touchscreen 151, the controller 180 may control either the trace of the first touch input or the trace of the second touch input to be displayed via the touchscreen 151 only by a user manipulation.

Figure 16:
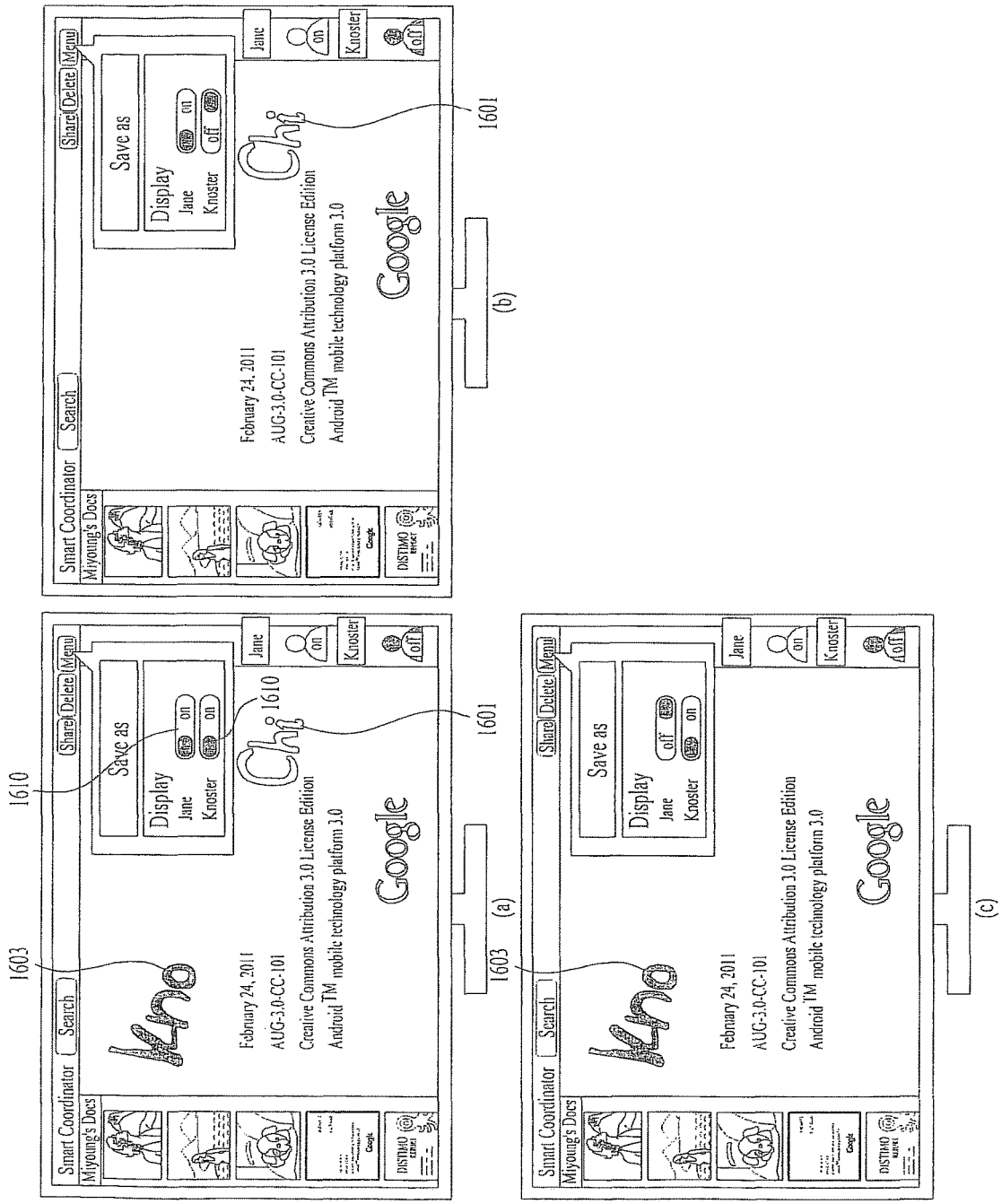
FIG. 16 is a diagram of display configuration for one example of controlling at least one of traces of first and second touch inputs to be displayed.

FIG. 16 is a diagram of display configuration for one example of controlling at least one of traces of first and second touch inputs to be displayed.

Referring to FIG. 16, if a button 'Menu' is selected, the controller 180 may control a drop box menu to be displayed [FIG. 16 (a)]. A user adjusts an On/Off toggle key 1610 provided via the drop box menu shown in FIG. 16 (a), thereby determining whether to display a trace of a touch input per external terminal 200.

For instance, referring to FIG. 16 (a), in case that setting values related to an external terminal 200 named Jane and an external terminal 200 named Knoster are set to 'On', the controller 180 may control traces 1601 and 1603 of touch inputs provided by the external terminal 200 named Jane and the external terminal 200 named Knoster to be displayed. On the other hand, referring to FIG. 16 (b), if the setting value of the external terminal 200 named Jane is set to 'On' but the setting value of the external terminal 200 named Knoster is set to 'Off', the controller 180 may be able to control a handwriting result 1603, which is provided by the external terminal 200 named Knoster, to be displayed only.

The controller 180 may be able to selectively display at least one of a plurality of handwriting results displayed on the touchscreen 151, as shown in FIG. 16. Hence, a user may be able to easily determine what kind of handwriting is performed on each external terminal 200.

Moreover, the controller 180 merges a content displayed on the touchscreen 151 with at least one of a plurality of the handwriting results and may then control the merged result to be saved.

Figure 17:
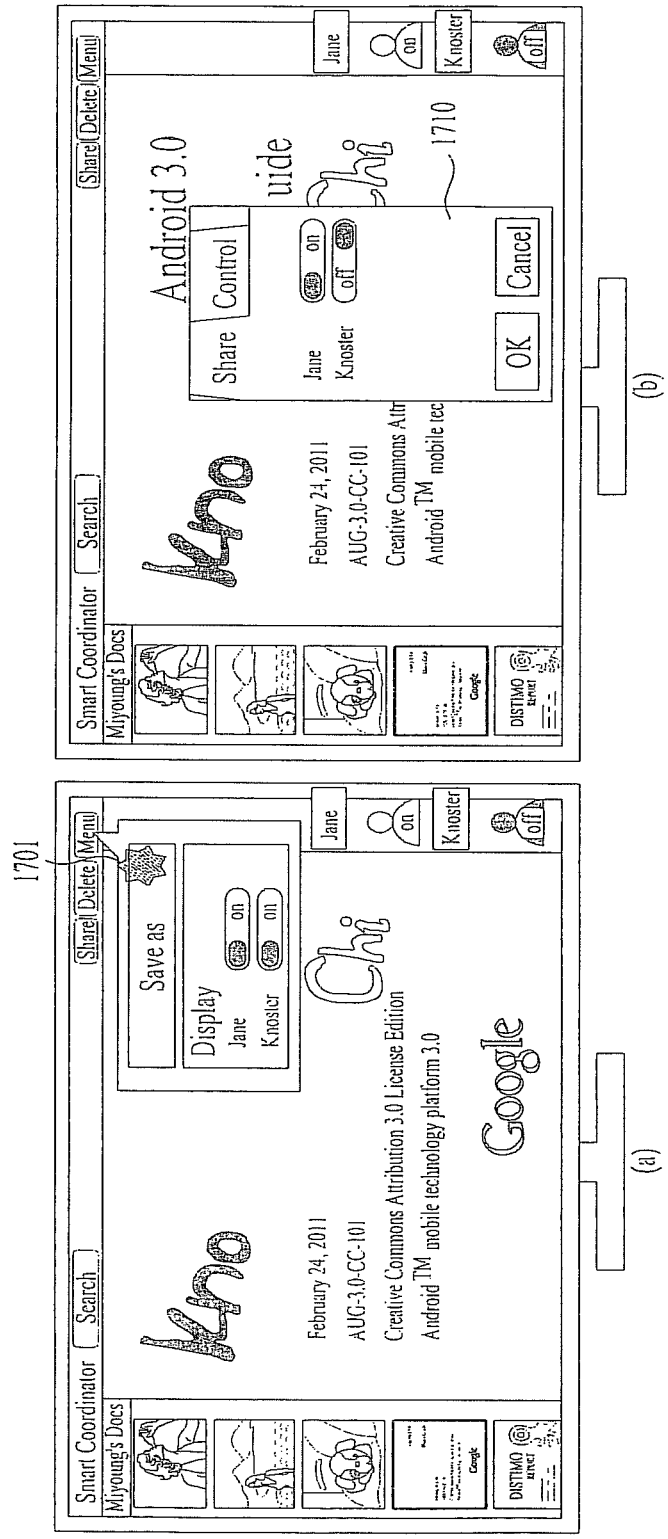
FIG. 17 is a diagram of display configuration for one example to describe a process for merging a content with at least one of a plurality of handwriting results and then saving the merged result.

FIG. 17 is a diagram of display configuration for one example to describe a process for merging a content with at least one of a plurality of handwriting results and then saving the merged result.

Referring to FIG. 17, assume that a touch input trace from an external terminal 200 named Jane and a touch input trace from an external terminal 200 named Knoster are displayed on the touchscreen 151 [FIG. 17 (a)]. Subsequently, if a button 'Save' 1701 is selected by a user manipulation, the controller 180 may control a menu screen 1710 to be displayed [FIG. 17 (b)]. In the menu screen 1710 shown in FIG. 17 (b), an external terminal 200 named Jane is set to 'On' and an external terminal 200 named Knoster is set to 'Off'. The controller 180 excludes a handwriting result received from the external terminal 200 named Knoster set to 'Off'. And, the controller 180 merges a content with a handwriting result received from the external terminal 200 named Jane and then saves the merged result. In particular, the controller 180 merges the content with the handwriting result provided by the external terminal 200 selected by a user among the handwriting results provided by a plurality of the external terminals 200 and then saves the merged result.

For clarity of the foregoing description, the terminal 100 in the first sharing method is assumed as the smart phone and the terminal 100 in the second sharing method is assumed as the smart TV. Yet, it may be unnecessary for the terminals 100 used by the first and second sharing methods to differ from each other. And, it is a matter of course that the terminals of the same kind can become the terminals 100 in the first and second sharing methods. Moreover, one terminal 100 is an entity of the first sharing method and may also become an entity of the second sharing method. In other words, the terminal 100 is a providing terminal that provides the external terminal 200 with a trace of a touch input and may also play a role as a receiving terminal that receives a trace of a touch input from the external terminal 200.

For instance, the controller 180 of the terminal 100 displays a trace of a touch input applied to the touchscreen 151 and may also control a trace of a touch input, which is applied to the external terminal, to be displayed at the same time. In particular, both of the trace of the touch input applied to the touchscreen 151 and the trace of the touch input applied to the external terminal 200 can be simultaneously displayed on the touchscreen 151. In doing so, referring to FIG. 15, the controller 180 may be able to control the trace of the touch input applied to the touchscreen 151 and the trace of the touch input applied to the external terminal 200 to be displayed in a manner of being visually identifiable from each other. Moreover, in the example shown in FIG. 17, the controller 180 may be able to further display a toggle key configured to determine whether to further merge the trace of the touch input applied to the touchscreen.

Accordingly, embodiments of the present invention provide various effects and/or features.

First of all, the present invention enhances convenience of user's manipulation.

Secondly, the present invention provides a terminal playing a role as a medium for facilitating a handwriting input to an external terminal.

Thirdly, the present invention provides a terminal capable of receiving and displaying a handwriting input performed via a separated external terminal.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touchscreen configured to display a content shared with an external terminal;
a wireless communication unit configured to communicate with the external terminal via a wireless network; and
a controller configured to control a handwritten image drawn along with a trace of a first touch input to be displayed on the touchscreen,
wherein in response to receiving the first touch input having a trace included in a portion of the content, the controller is further configured to control the handwritten image drawn along with the trace of the first touch input to be additionally shared with the external terminal based on whether an input authorization is granted to the external terminal, and
the controller is further configured to:
control the wireless communication unit to transmit selectively the same content or different content to the external terminal,
determine whether to transmit, to the external terminal, information on the trace of a second touch input recognized at the mobile terminal, wherein determine whether to transmit the information includes:
when each of the touchscreen and the external terminal is determined to not output the same content, control the trace of the first touch input to be displayed on the content outputted via the touchscreen,
wherein the controller is further configured to control the trace of the second touch input to not be transmitted to the external terminal, and the content is generated independently from the second touch input, and when each of the touchscreen and the external terminal is determined to output the same content, control the trace of the first touch input to be displayed on the content outputted by each of the external terminal and the touchscreen,
display, on the touchscreen, a toggle key configured to determine whether to merge the trace of the second touch input received via the touchscreen with another touch trace received from the external terminal,
merge the trace of the second touch input with the another touch trace when the toggle key is selected, and
simultaneously display, on the touchscreen, both the trace of the second touch input and the another touch trace, wherein the trace of the second touch input received via the touchscreen and the another touch trace received from the external terminal are visually identifiable from each other.

2. The mobile terminal of claim 1, wherein when the input authorization is granted to the external terminal, the controller is further configured to control the handwritten image to be shared with the external terminal.

3. The mobile terminal of claim 2, wherein
when the input authorization is not granted to the external terminal, the controller is further configured to control the handwritten image to be not shared with the external terminal.

4. The mobile terminal of claim 2, wherein the controller is further configured to control the display to further display an object indicating whether the external terminal has the input authorization.

5. The mobile terminal of claim 1, wherein the controller is configured to control the trace of the second touch input to be displayed in a first color, and to control the trace of the another touch trace to be displayed in a second color different than the first color such that the trace of the second touch input and the another touch trace are visually identifiable from each other.

6. The mobile terminal of claim 1, wherein the controller is configured to control the trace of the second touch input to be visually identifiable from the another touch trace based on different patterns, different thickness or different transparencies of the traces.

7. A method of a mobile terminal, the method comprising:
receiving a first touch input at a touchscreen;
sharing a content selected by the first touch input with an external terminal via a wireless communication unit; and
receiving a second touch input at the touchscreen,
wherein after receiving the second touch input having a trace included in a portion of the content, the method further comprises:
sharing a handwritten image drawn along with the trace of the second touch input with the external terminal additionally based on a setting value indicating whether the handwritten image is set to be shared,
controlling the wireless communication unit to transmit selectively the same content or different content to the external terminal,
determining whether to transmit, to the external terminal, information on the trace of the second touch input recognized at the mobile terminal, wherein determining whether to transmit the information includes:
controlling the trace of the second touch input to be displayed on the content outputted via the touchscreen and controlling the trace of the second touch input to not be transmitted to the external terminal, when each of the touchscreen and the external terminal is not outputting the same content, wherein the content is generated independently from the second touch input,
controlling the trace of the second touch input to be displayed on the content outputted by each of the external terminal and the touchscreen when each of the touchscreen and the external terminal is outputting the same content,
displaying, on the touchscreen, a toggle key configured to determine whether to merge the trace of the second touch input received via the touchscreen with another touch trace received from the external terminal,
merging the trace of the second touch input with the another touch trace when the toggle key is selected, and
simultaneously displaying, on the touchscreen, both the trace of the second touch input and the another touch trace, wherein the trace of the second touch input received via the touchscreen and the another touch trace received from the external terminal are visually identifiable from each other.

8. The method of claim 7, further comprising:
simultaneously displaying an additional content, which is not shared with the external terminal, with the content, which is shared with the external terminal.

9. The method of claim 8, wherein the handwritten image is displayed on both the content and the additional content.

10. The method of claim 7, wherein when the setting value indicates that the handwritten image is set to be shared, the handwritten image is displayed on both the touchscreen and the external terminal.

11. The method of claim 10, wherein when the setting value indicates that the handwritten image is set to be not shared, the handwritten image is displayed only on the touchscreen other than the external terminal.

12. The method of claim 7, wherein the simultaneously displaying includes displaying the trace of the second touch input in a first color and displaying the trace of the another touch trace in a second color different than the first color such that the trace of the second touch input and the another touch trace are visually identifiable from each other.

13. The method of claim 7, wherein the simultaneously displaying includes displaying the trace of the second touch input to be visually identifiable from the another touch trace based on different patterns, different thicknesses or different transparencies of the traces.

* * * * *